(12) United States Patent
Stafford et al.

(10) Patent No.: US 11,977,093 B2
(45) Date of Patent: May 7, 2024

(54) PERSONAL RADIATION DOSIMETER AND DENSITY METER SYSTEM AND METHODS OF USE

(71) Applicant: THERMO SCIENTIFIC PORTABLE ANALYTICAL INSTRUMENTS INC., Tewksbury, MA (US)

(72) Inventors: Joy Stafford, Billerica, MA (US); Andrew Leoni, Billerica, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 0 days.

(21) Appl. No.: 17/935,978

(22) Filed: Sep. 28, 2022

(65) Prior Publication Data

US 2023/0142667 A1  May 11, 2023

Related U.S. Application Data

(60) Provisional application No. 63/254,610, filed on Oct. 12, 2021.

(51) Int. Cl.
  *G01N 9/00* (2006.01)
  *G01T 1/02* (2006.01)
  *G01T 7/12* (2006.01)

(52) U.S. Cl.
  CPC ............. *G01N 9/00* (2013.01); *G01T 1/02* (2013.01); *G01T 7/125* (2013.01)

(58) Field of Classification Search
  CPC ..................................................... G01N 9/00
  USPC .......................................................... 73/32 R
  See application file for complete search history.

(56) References Cited

U.S. PATENT DOCUMENTS

| | | | |
|---|---|---|---|
| 4,443,702 | A | 4/1984 | Hearn |
| 5,572,027 | A | 11/1996 | Tawil et al. |
| 6,388,250 | B1 | 5/2002 | Croydon et al. |
| 7,544,927 | B1 | 6/2009 | Iwatschenko-Borho |
| 9,310,324 | B2 | 4/2016 | Jarvikivi et al. |
| 10,365,378 | B2 | 7/2019 | Nelson et al. |
| 10,782,420 | B2 | 9/2020 | Nelson |
| 2014/0055271 | A1* | 2/2014 | Chowdhary ........... G08B 21/18 340/600 |
| 2014/0319330 | A1 | 10/2014 | Berheide et al. |
| 2015/0041651 | A1 | 2/2015 | Joung |
| 2021/0197078 | A1* | 7/2021 | Yildiz .................... G06F 1/1613 |

FOREIGN PATENT DOCUMENTS

WO    WO-2012037224 A2 *  3/2012  ............... G01T 1/10

OTHER PUBLICATIONS

Thermo Scientific: "RadEye PRD-CD System: Contraband and Radioactivity Detection System", Product Specifications, 2014, eV1.6, 2 Pages.

* cited by examiner

*Primary Examiner* — Walter L Lindsay, Jr.
*Assistant Examiner* — Philip T Fadul
(74) *Attorney, Agent, or Firm* — William R McCarthy, III

(57) ABSTRACT

A personal radiation and density meter system includes a housing, a radiation detection subsystem and a radiation emitting sub-system. The housing includes an interior portion configured as an interior space, and a slot. The radiation detection sub-system includes a personal radiation dosimeter positioned in the slot. The radiation emitting sub-system includes a shield assembly, a source, an actuator, a trigger, and an aperture.

19 Claims, 16 Drawing Sheets

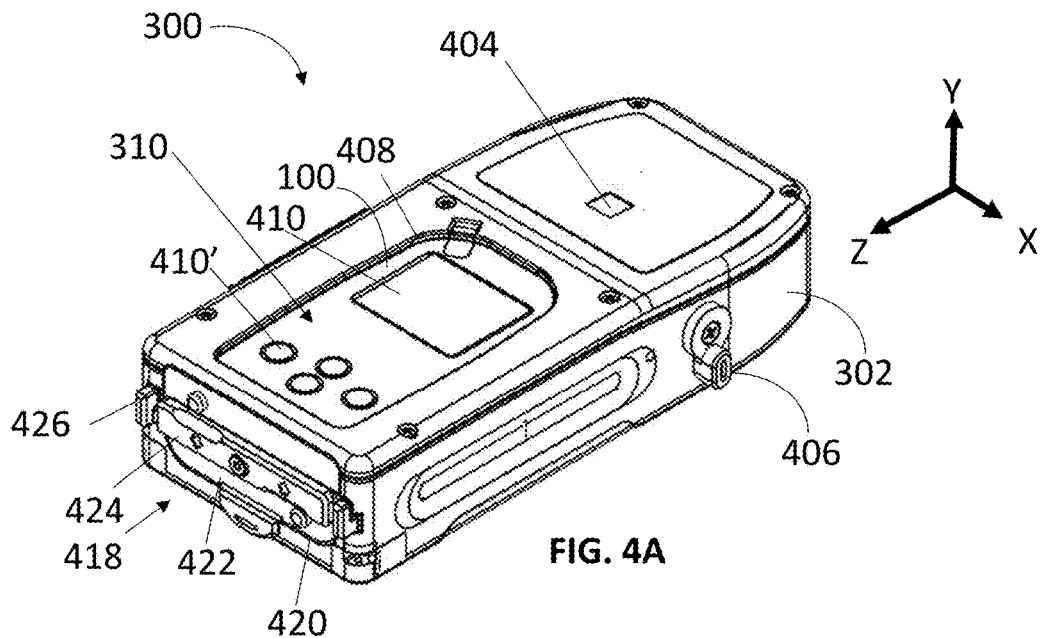
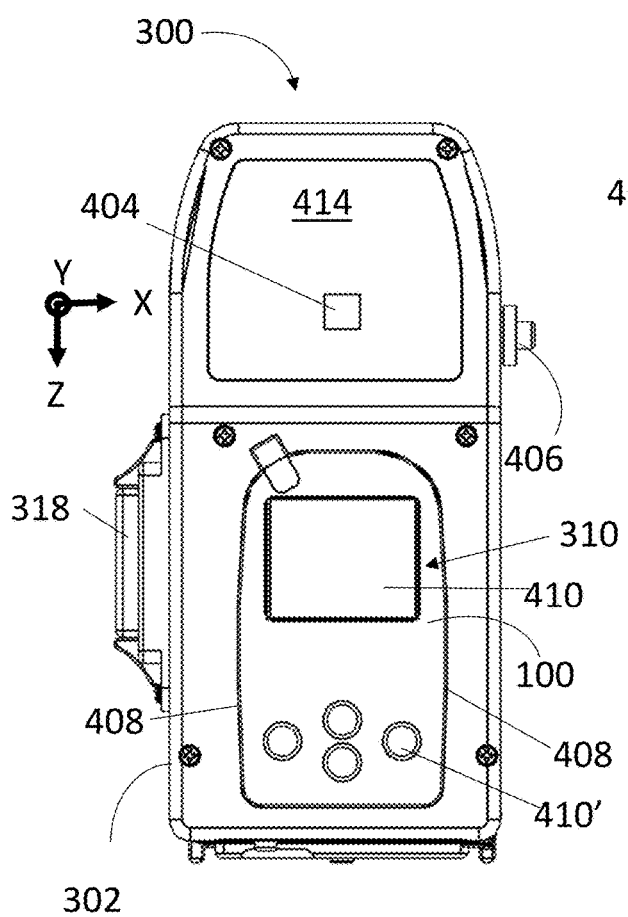
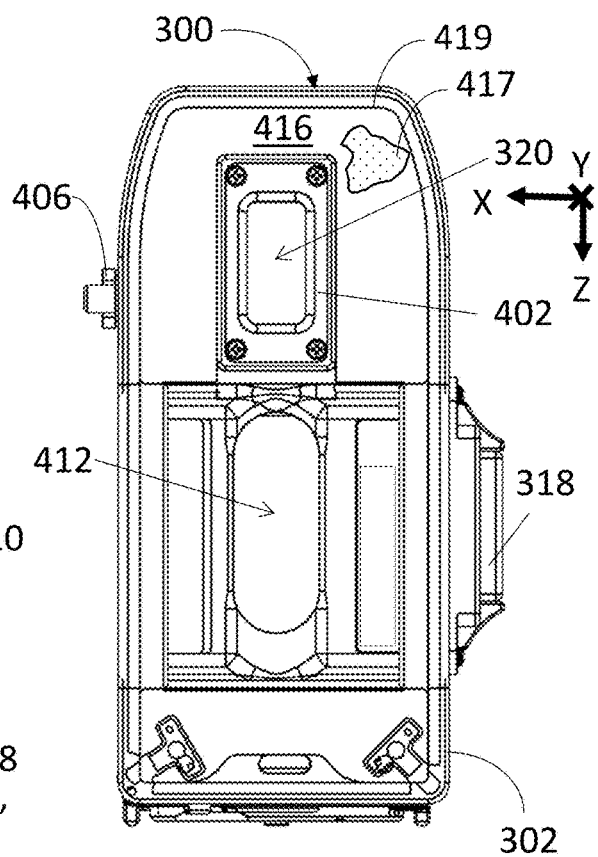
FIG. 4A
FIG. 4B
FIG. 4C

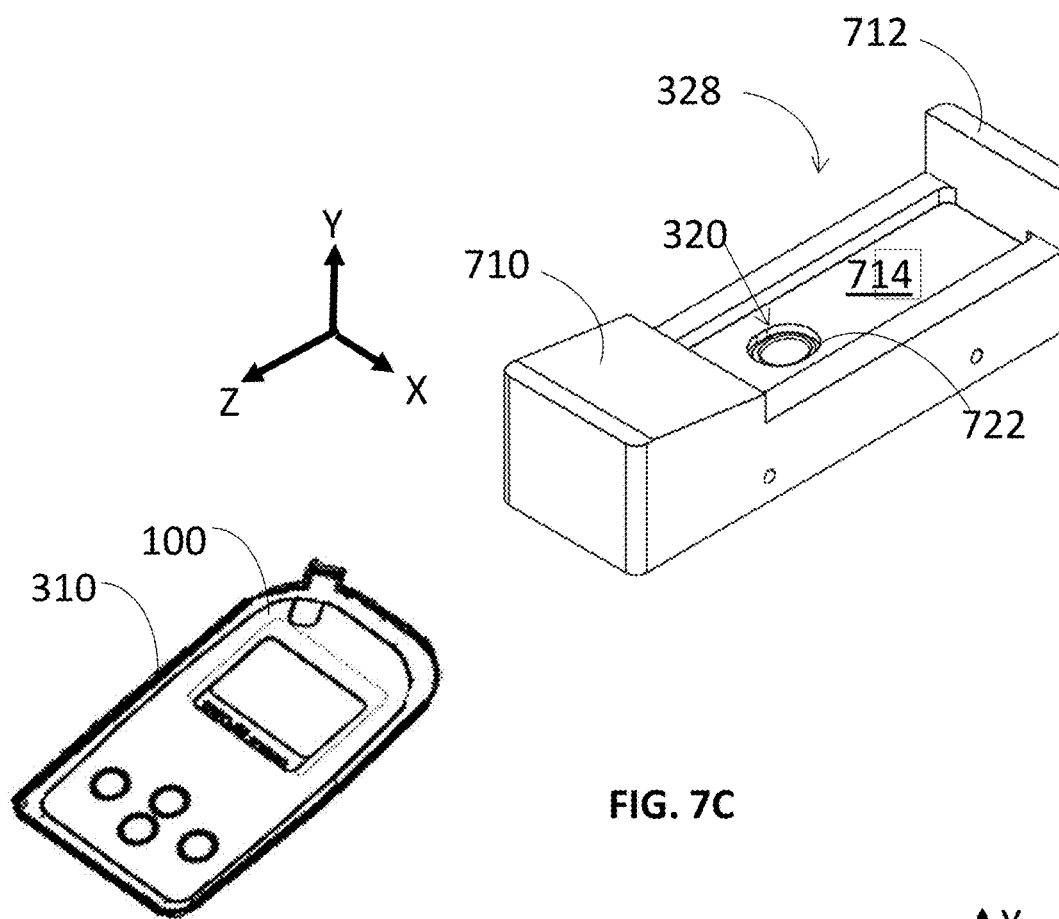
FIG. 7C
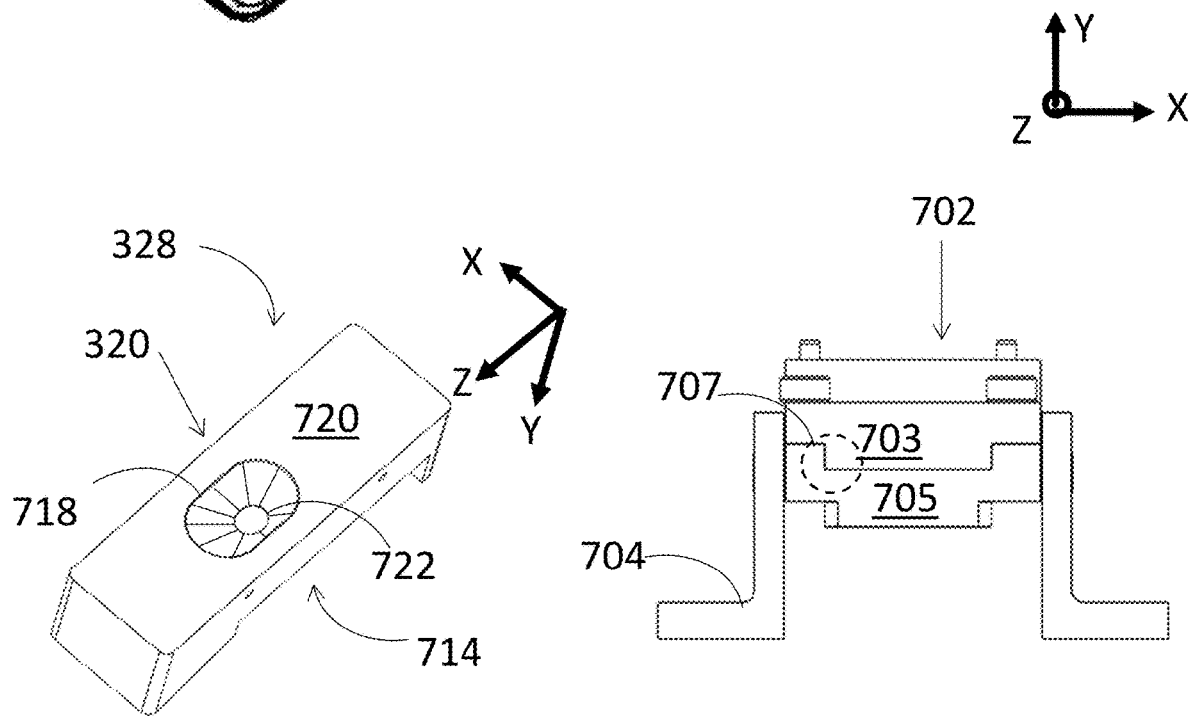
FIG. 7D
FIG. 7E

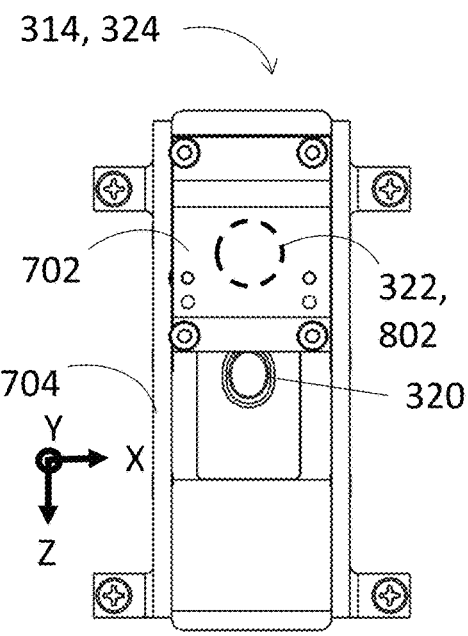
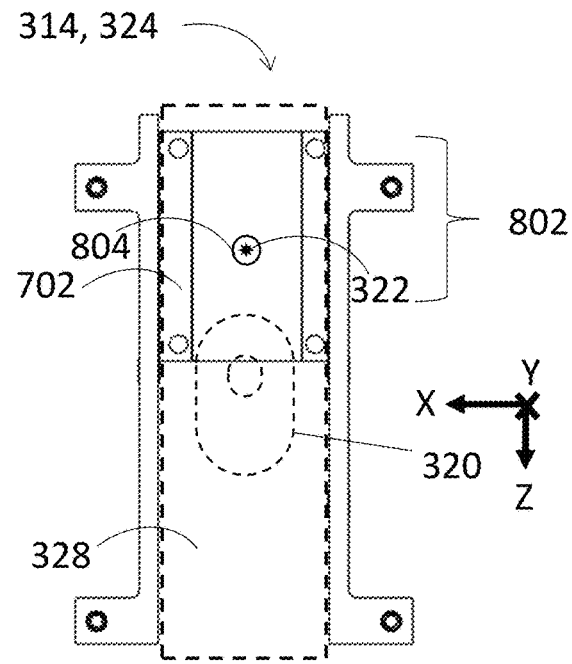
FIG. 8A  FIG. 8B
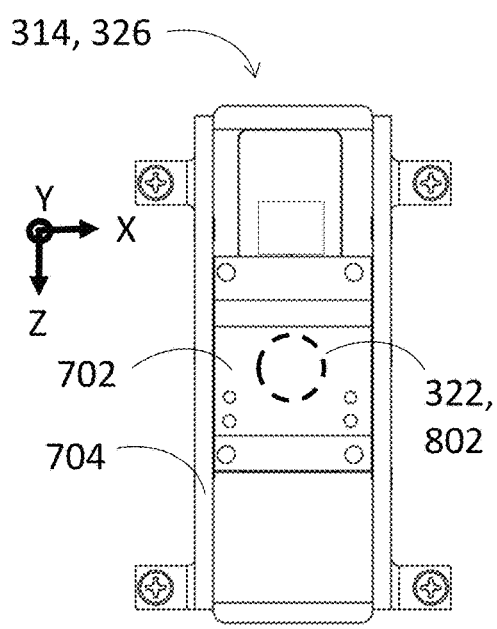
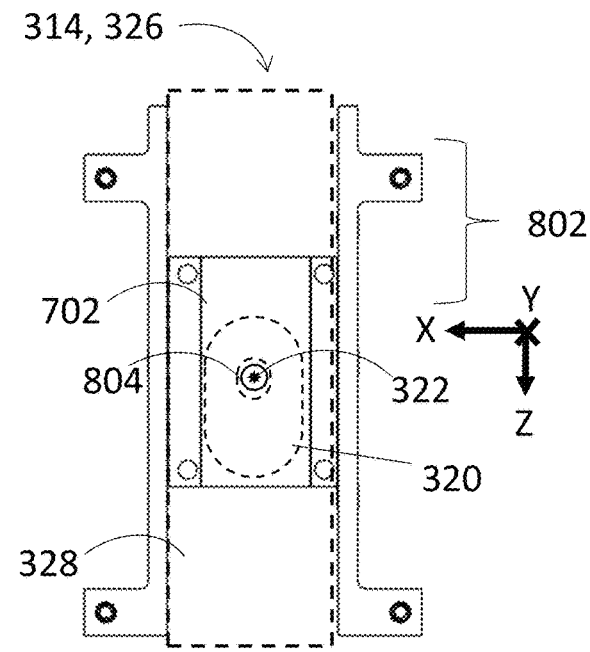
FIG. 8C  FIG. 8D

PERSONAL RADIATION DOSIMETER AND DENSITY METER SYSTEM AND METHODS OF USE

CROSS-REFERENCE TO RELATED APPLICATIONS

This application claims priority to U.S. application No. 63/254,610 filed Oct. 12, 2021, which disclosure is herein incorporated by reference in its entirety.

FIELD OF THE INVENTION

A handheld portable densitometer utilizing a personal radiation detection dosimeter for the analysis of unknown volumes for unexpected density profiles.

BACKGROUND OF THE INVENTION

Detection of visually hidden items and radioactive materials presents a challenge that is especially important to law enforcement, boarder control and first responders. For example, in the United States, Customs and Border Protection (CBP), an agency of the Department of Homeland Security (DHS), is responsible for targeting, selecting, and examining cargo deemed high risk for terrorist-related activity, smuggling of contraband, and trade law violation. As well as large stationary devices, such as x-ray imaging systems capable of automatically scanning entire vehicles, and area radiation monitors, smaller portable devices for individual use are included in the enforcement agent's arsenal. These include radiation dosimeters and density meters.

There are several available radiation dosimeters where a first class is referred to as a "passive" dosimeter that is sensitive to ionizing radiation and which records a value of cumulative radiation dose. Passive dosimetry devices, such as for example thermoluminescent dosimeters ("TLD") are widely used to monitor exposure to radiation. These devices, although useful, are limited in that they do not provide real time feedback to the user, where a reading is provided weeks or months after an actual exposure to ionizing radiation. A second class of dosimeter is referred to as an "active" dosimeter, which may continuously measure radiation and provides a communication reporting the dose value to the user.

As referred to herein, active personal dosimeters are denoted Personal Radiation Dosimeters (PRDs). PRDs can also denote Spectroscopic Personal Radiation Dosimeters (SPRD). PRDs that are not SPRDs can detect in real time a dose value but are blind with respect to the kind of radiation. SPRDs not only detect radiation in real time but can also provide spectroscopic information. For example, where a non-spectroscopic PRD may be able to detect gamma-radiation strength, an SPRD can provide information about radiation strength as well as gamma-ray spectroscopic information. The gamma-ray spectroscopic information from an SPRD may be used to provide identification of radionuclides. SPRDs may also be equipped with other detectors, such as neutron detectors. PRDs are known in the art, for example as described in U.S. Pat. Nos. 5,572,027; 6,388, 250; 10,782,420; and 10,365, 378, which are incorporated by reference herein in their entirety.

FIGS. 1A and 1B illustrate a prior art PRD. FIG. 1A shows a front view of a PRD 100 indicating a view screen 102 and control buttons 104. FIG. 1B shows a back view of the PRD 100 indicating the location of a detector 106, and the location of a batteries 108. Both non-spectroscopic PRDs and SPRDs can have a similar form factor but have different components in their interior (not shown in FIGS. 1A, 1B). For example, an SPRD can have multiple detectors, additional circuitry, more computer processing power, and different algorithms required for spectroscopic analysis. This can also translate to a larger size and weight for SPRDs, as well as a different user interface to activate additional/different features. Some other features (not shown of PRDs can include clips or straps for attachment to a belt or directly to a user (e.g., an arm) and the PRD can come equipped with a carry holster. The user can passively wear the device, for example, as the user inspects cargo, or the user can more actively hold the device towards an area of interest, either directly, or even with an extension arm or flexible tether. The devices can also be wirelessly (e.g., WiFi, BlueTooth, ZigBee) and GPS enabled for central tracking and monitoring.

As used herein, "density meters" or "densitometers" refer to portable devices for scanning a volume and detecting hidden or obscured objects in the volume. Density meters use low intensity gamma sources combined with a radiation detection system. FIG. 2 shows a diagrammatic view of a prior art density meter 200. The density meter 200 includes a gamma source 202 and detector 204. The device is positioned against a surface 206 to allow gamma rays 208 to penetrate through barrier 210, and the level of backscattered radiation 212 detected by detector 204 is measured. The measured backscattered radiation 212 is proportional to the density of the volume 214 behind the surface 206. This value is compared to expected density ranges for the volume 214 to give an indication of possible material 216 hidden in the volume 214, such as in a cavity. This technology is used extensively in border patrol type activities and checkpoint inspections. For example, this technology is used by border patrol to examine containers and vehicles for smuggled goods at security checkpoints. Vehicle doors panels, seat cushions, tires, packaged items and goods (coffee bags, stuffed toys, cereal boxes, etc.) can be checked for contraband, money, guns, and drugs.

The gamma radiation selected for use in densitometers is highly scattered by light elements (e.g., H, O, C, and N). This makes the detection of these elements possible by the backscattered radiation, where the same radiation is absorbed by heavier elements (e.g., Fe). Typically, radiation is selected for penetration through several millimeters of steel. The advent of a high backscatter from behind a steel surface can be indicative of materials, such as drugs, money, or other contraband.

While there are the above identified portable solution for monitoring radiation and concealed items, these often require two separated devices. Considering many other items strapped or worn by the user, such as armor, a side arm, chemical analyzers, communication devices etc., there is a need in the art for solutions that consolidate, modularize and reduce the footprint and weight of these items, both for reasons of convenience, comfort, and cost. In addition to being functional, the devices should be rugged and easy to use in difficult to reach areas.

SUMMARY

In accordance with a first aspect, a personal radiation and density meter (PRDM) system includes a housing, a radiation detection subsystem and a radiation emitting subsystem. The housing includes an interior portion configured as an interior space, and a slot. The radiation detection sub-system includes a personal radiation dosimeter (PRD)

positioned in the slot. The radiation emitting sub-system includes a shield assembly, a source, an actuator, a trigger, and an aperture. The shield assembly is in the interior portion and surrounds a radiation source. The actuator is also in the interior portion and is coupled to the shield assembly, where the actuator is configured under user-initiated control to move the shield assembly from a shielding configuration to an exposure configuration. The trigger is mounted to the housing and coupled to the actuator for one-hand control of the actuator. The aperture is defined through a wall of the shield assembly and configured to direct radiation out of the shield assembly when the shield assembly is in the exposure configuration.

In accordance with a second aspect, a method for probing a density is provided, the method including holding the PRDM system and positioning the aperture opposite to a first area of a surface bounding a volume to be probed; engaging the trigger to move the shield assembly from the shielding configuration to the exposure configuration; acquiring first measurements with the PRD from backscattered radiation from the radiation source, said first measurements indicative of a first density in the volume; moving the system to a second area of the surface and acquiring second measurements with the PRD from backscattered radiation from the radiation source, said second measurements indicative of a second density in the volume; and disengaging the trigger and allowing the shield assembly to return to the shielding configuration.

According to a third aspect, a personal emission device for converting a dosimeter to a density meter includes; a housing, a radiation source, a shield assembly, an actuator, a trigger, an aperture, and a slot. The housing includes an interior portion defining an interior space. The radiation source is in the interior portion, where the shield assembly is in the interior portion and surrounds the source. The actuator is also in the interior portion and is coupled to the shield assembly, the actuator is configured under user control to move the shield assembly from a shielding configuration to an exposure configuration. The trigger is mounted to the housing and coupled to the actuator for one-hand control of the actuator. The aperture is defined through a wall of the shield assembly and is configured to direct radiation out of the shield assembly when the shield assembly is in the exposure configuration. The slot is configured for removable placement of a PRD.

The PRDM systems described combined PRD with a source in a housing, where the PRD provides detection of scattered radiation derived from the source. This is economical both with respect to space and monetary resources, since a single PRD can be coupled with the source without need of a separate density meter. Furthermore, the system is designed for ease of positioning of the PRD in the slot, so that conversion from a dosimeter to a density meter is efficient. The PRDM systems are also designed for ruggedness and ease of use, such as single handed/ambidextrous use.

BRIEF DESCRIPTION OF THE DRAWINGS

The foregoing and other features and advantages of the present embodiments will be more fully understood from the following detailed description of illustrative embodiments taken in conjunction with the accompanying drawings

FIGS. 4A-4D and illustrate some externally visible features of a PRDM system, according to some implementations. FIG. 4A shows an isometric view, FIG. 4B shows a front view, and FIG. 4C shows a back view. FIG. 4D shows three views (panels I, II and III) of a switch.

FIG. 6A shows a front view of the PRDM system, where a housing cover 602 is shown removed to reveal the interior elements. FIG. 6B show an isometric view of interior components.

FIGS. 7A-7E show views of the shield assembly, according to some implementations. FIG. 7A shows a shielding configuration in isometric view and FIG. 7B shows an exposure configuration in isometric view. FIG. 7C shows an isometric view of a wall of the shield assembly and relative positioning of a PRD. FIG. 7D shows a 3D view of the wall oriented to view the back of the wall. FIG. 7E shows a bottom view of a container for holding a source.

FIGS. 8A-8D show additional views of the shield assembly. FIG. 8A shows a front view of the shield assembly in the shielding configuration. FIG. 8B shows a back view of the shield assembly in the shielding configuration. FIG. 8C shows a front view of the shield assembly in the exposure configuration. FIG. 8D shows a back view of the shield assembly in the exposure configuration.

FIG. 9A shows a front view. FIG. 9B shows an isometric view. FIG. 9C is a detailed right-side view. FIG. 9D is another detailed right-side view. FIG. 9E is a detailed top view. FIG. 9F is detailed right-side view. FIG. 9G is another detailed right-side view. FIG. 9H is a detailed left-side view.

FIG. 11A is a front view while FIG. 11B is a right-side view.

FIG. 12A shows emission dose rate around the y-axis with the shutter closed. FIG. 12B shows emission dose rate around the x-axis with the shutter open. FIG. 12C shows emission dose rate around the x-axis with the shutter closed. FIG. 12D. shows emission dose rate around the z-axis with the shutter open. FIG. 12E shows emission dose rate around the z-axis with the shutter closed.

Figure 1A:
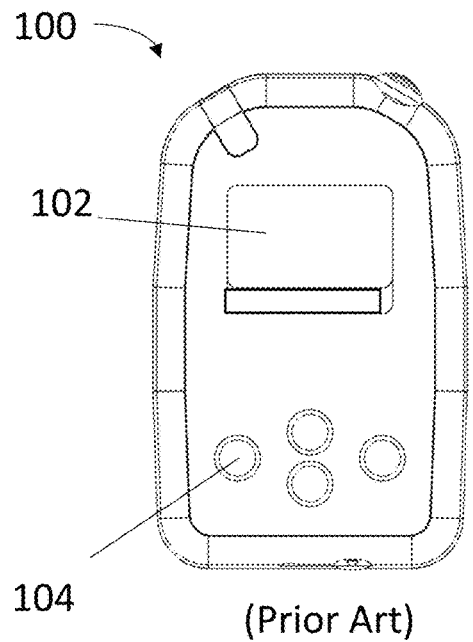
FIG. 1A is a front view of a PRD.
Figure 1B:
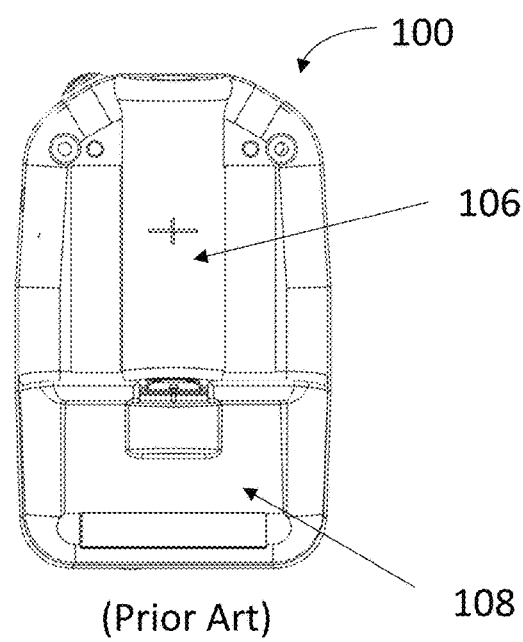
FIG. 1B is a back view of the PRD shown in FIG. 1A.

The figures referred to above are not drawn necessarily to scale, should be understood to provide a representation of particular embodiments, and are merely conceptual in nature and illustrative of the principals involved. Some features of the radiation detector depicted in the drawings have been enlarged or distorted relative to others to facilitate explanation and understanding. The same reference numbers are used in the drawings for similar or identical components and features shown in various alternative embodiments. Radiation detectors, sources and density meters as disclosed herein would have configurations and components determined, in part, by the intended application and environment in which they are used.

Where cartesian coordinates (X, Y, Z) are indicated, the arrows show the positive directions, "O" indicates an arrow pointing outwards and perpendicular to the page, "X" indicates an arrow pointing inward and perpendicular to the page. These provide guidance for orientation and relationships of various components and do not denote a magnitude. Also, as used herein, a front view is viewing in the −Y direction, the back view is viewing in the +Y direction, a right-side view is viewing in the −X direction, a left-side view is viewing in the X direction, a top view is viewing in the −Z direction, and a bottom view is viewing in the +Z direction.

DETAILED DESCRIPTION OF EMBODIMENTS

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Figure 3:
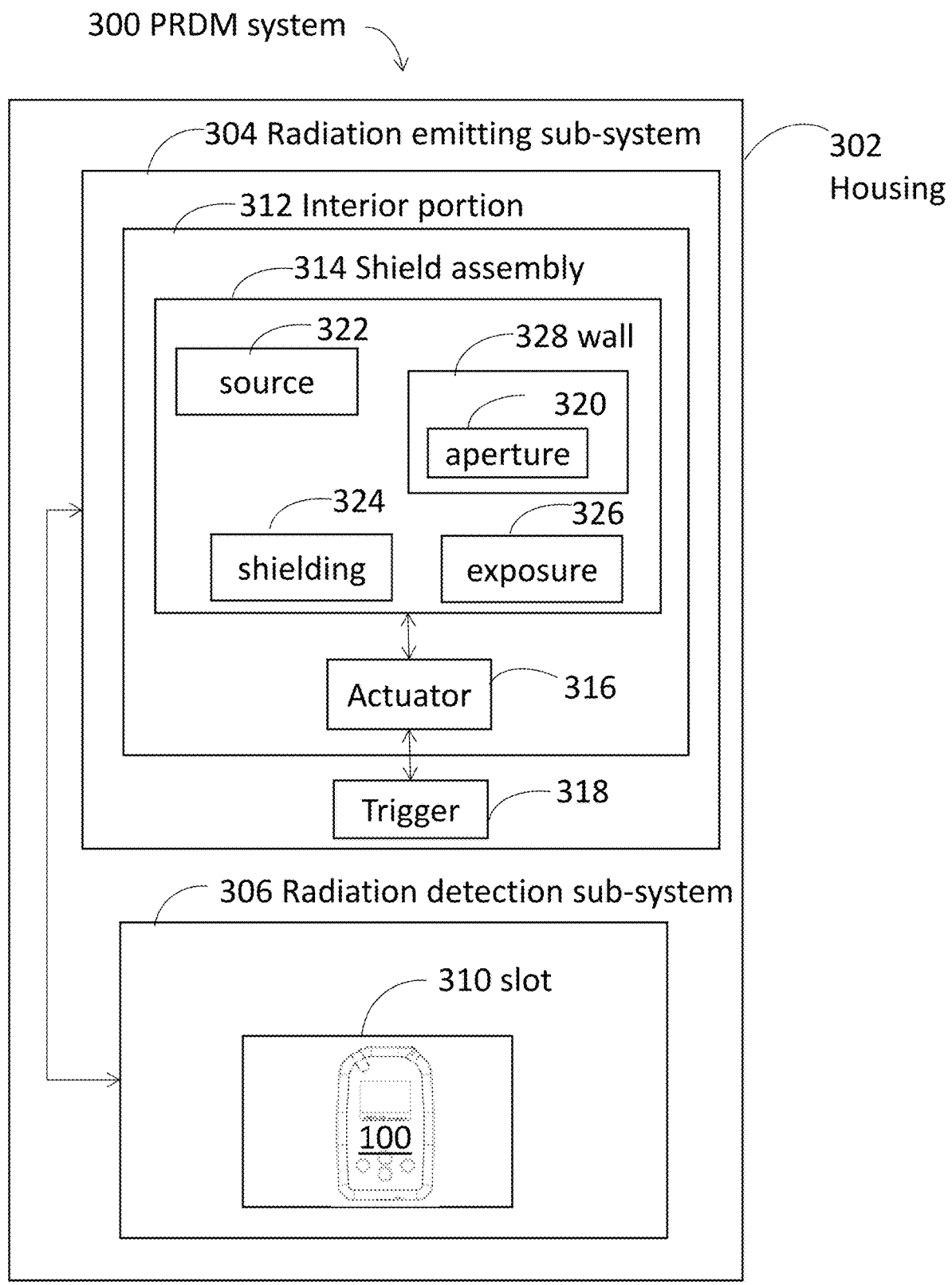
FIG. 3 is a block diagram illustrating various components of a personal radiation and density meter (PRDM) system, according to some implementations.

FIG. 3 is a block diagram showing an implementation of a personal radiation and density meter (PRDM) system 300. The PRDM system 300 includes a housing 302, a radiation emitting sub-system 304, and a radiation detection sub-system 306.

The housing 302 can be designed for compactness, ruggedness, and ergonomic use. For example, the housing is dimensioned to be handheld, such as to be used single handedly and ambidextrously by a typical adult user (female or male). Materials for construction can be selected to be durable, light weight, and rigid. Without limitations, materials selected for the housing can include engineering plastics and light or thin metals. For example, the materials used for housing 302 are chosen so that the various components do not move, except as indicated herein, relative to each other. For example, relative movement of the source 322 in the exposure configuration 326 to the PRD 100 in slot 310, is less than 1 mm under handling conditions. Other features of the housing 302, such as hooks, grips, fasteners, straps and combinations thereof, can be included for convenience, safety and ergonomic needs.

The housing 302 integrates the various components into the PRDM system 300. The radiation emitting sub-system 304 includes an interior portion 312 in the housing 302 and a trigger 318 mounted to the housing 302. The interior portion 312 is configured as an interior space in the housing 302 and includes a shield assembly 314 and an actuator 316. The shield assembly 314 surrounds or encloses a radiation source 322. The trigger 318 is coupled to the actuator 316. The shield assembly 314 includes a wall 328 which includes an aperture 320 therethrough. The radiation detection sub-system includes a slot 310 in the housing. The slot 310 is configured for placement or positioning of the PRD 100 therein.

The shield assembly 314 includes a shielding configuration 324 wherein the radiation source 322 is completely or maximally enclosed. The purpose of the shielding configuration 324 is to limit or eliminate radiation escaping from the radiation source 322 to the environment. In the shielding configuration 324, the PRDM system 300 cannot be used for density measurement since no or insufficient radiation is emitted from the radiation source 322 for any measurable backscatter to be produced. The shield assembly 314 also includes an exposure configuration 326. In the exposure configuration 326, the radiation source 322 can emit radiation out of the shield assembly 314 through the aperture 320, which is defined in a wall 328 of the shield assembly 314. In the exposure configuration, the PRDM system 300 can be used for density measurements.

The radiation source 322 can include a gamma emitting element. For example, the radiation source can be selected to include Ba-133, Be-7, Na-22, Na-24, Mn-54, Co-57, Co-60, Ga-66, Tc-99m, Pd-103, Ag-112, Sn-113, Te-132, I-125, I-131, Xe-133, Cs-134, Cs-134, Cs-137, Ba-133, La-140, Ce-144, Eu-152, Yb-169, Ir-192, Au-198, Bi-207, Rn-222, Ra-226, Th-228, Am-241, Cf-252, Fm-252, or Lu-176. In some implementations, the radiation source 322 is a source determined by the US Nuclear Regulatory Commission to be exempt from requirements for a license, as listed at www.nrc.gov/reading-rm/doc-collections/cfr/part030/part030-0071.html, accessed Sep. 27, 2021, and incorporated by reference herein in its entirety. In some implementations, the gamma source includes Ba-133.

The shield assembly 314 can include elements with high Z number which will absorb radiation. For example, in some implementations, the elements tungsten, lead, iron, and alloys thereof can be included in the shield assembly 314. In some implementations, the shielding material includes at least about 50% (e.g., at least about 60%, 70%, 80%, 90% or 99%) tungsten and a thickness of at least about 1 mm (e.g., at least about 2 mm, 3 mm, 4 mm or 5 mm). In some implementations, the tungsten thickness is between about 1 mm and about 100 mm (e.g., between about 5 mm and about 60 mm). In some implementations, a workable tungsten alloy having about 80% tungsten is used in the shielding assembly with a thickness between about 1 and about 100 mm (e.g., between about 5 mm and about 60 mm) is used.

It is understood that the shielding requirements depend on the type and amount of radiation source 322. For example, in implementations using a 370 kBq, 10 μCi Ba-133 gamma source, the radiation at 45 cm is at least about 85% attenuated by a titanium wall of thickness of at least about 10 mm. In some implementations, shielding reduces radiation emitted from the source in any direction at least by about 50% (e.g., at least about 60%, 70%, 80%, 90% or 99%).

The shield assembly 314 can include a shutter to cover the aperture 320 when the shield assembly 314 is in the shielding configuration 324. For example, the shutter can include a wall, leaf, screen or other barrier that moves (e.g., linearly, curvilinearly) in front of, or into the aperture 320, thereby sealing/covering the aperture 320. The shutter can also move to a position not sealing/covering the aperture 320 when the shield assembly 314 is in the exposure configuration 326. In some implementations, the shield assembly 314 can move the aperture away from the radiation source 322, where a solid part of wall 328 or another portion of the shield assembly 314 is positioned in front of the radiation source 322.

The actuator 316 is any device that can toggle the components of the shield assembly 314 from the shielding configuration 324 to the exposure configuration 326, and from the exposure configuration 326 back to the shielding configuration 324. Without limitation, and by way of example, the actuator 316 can include gears, cogs, springs, rails, slots, pins, pulleys, levers, chains, belts, wheels, and combinations thereof. The actuator 316 is controlled by the trigger 318, which can be engaged by one-hand of a user to toggle between the shielding configuration 324 and the exposure configuration 326. The actuator 316 can translate a first movement vector of the trigger 318 to a second movement vector required to change the shielding configuration. For example, in one implementation, the trigger 318 can be a button, wherein when the button is pressed it moves in a first direction and a first distance, the actuator 316 translating this first movement and first distance, to a second movement and second distance. Without limitation, the trigger 318 can include a button, a lever, a switch, a pull cord, or a knob.

Three views of an embodiment of the PRDM system 300 are shown by FIGS. 4A-4C and illustrate some externally visible features. FIG. 4A shows an isometric view, FIG. 4B shows a front view, and FIG. 4C shows a back view. The PRD 100 is shown in the slot 310 of the housing 302 (FIGS. 4A, 4B). The trigger 318 is shown mounted to a left side of the housing 302 (FIGS. 4B, 4C).

The position of the aperture 320 is shown (FIG. 4C). In this embodiment, the aperture 320 is covered by a radiation transparent window 402, such as a mylar window (FIG. 4C). In some other embodiments, other radiation transparent materials can be used, including thin metal foils (e.g., Titanium and Aluminum) or thin plastic films. Although optional, the radiation transparent window 402 protects the interior portion 312 of the PRDM system 300 from contamination from environmental contaminants such as water, dirt, and dust. As used herein "radiation transparent" refers to material that allow radiation emitted from the radiation source 322 to pass therethrough. For example, at least 50% (e.g. at least 60%, 70%, 80%, 90%, 99%) of the radiation is not scattered, reflected or absorbed by the radiation transparent window. On a front side 414, a viewing window 404 can be included in the housing 302 (FIGS. 4A, 4B). The viewing window 404 provides a view to the interior portion 312 of the housing 302.

FIG. 4C shows the positioning of a detector 412 of the PRD 100. The detector 412 is positioned on a back-side 416 of the housing 302. The detector 412 is positioned to detect backscattered radiation traveling in a general direction towards the back 416 of the housing 302 and the detector 412. As used herein "detector" can refer to multiple detectors. For example, in embodiments when the PRD is an SPRD, several detectors can be used to detect different energy and types of radiation. The detector 412 can be any radiation detector such as PIN detectors and scintillation counters. In some implementations, the detector is a silicon photomultiplier (SiPM) detector.

FIGS. 4A-4C also show a safety latch 406 mounted to the right side of the housing 302. The safety latch 406 is configured to bloc movement of the shield assembly 314 from the shielding configuration 324 and avoids unintentionally engaging the exposure configuration 326.

In some implementations, the back-side 416 includes a low friction surface 417, shown in FIG. 4C as partially covering the back-side 416. It is understood that part or the entire back-side 416 can include the low friction surface 417. The low friction surface 417 is selected to allow the surface of the back-side 416 to easily slide across a surface of an object being inspected while also not damaging the surface (e.g., non-scratching). The material allows for a user to slide the PRDM system 300 against a surface at a constant rate, without sticking/stopping. For example, a low friction surface 417 can include woven and non-woven fabrics with an adhesive that is applied to the back-side 416 so that the fabric forms an outer surface covering at least a portion of the back-side 416. Some non-limiting low friction surfaces 417 include felt and the loop side of hook and loop materials. In some implementations, the materials used for low friction surface 417 are low wetting materials so that they do not absorb and retain water and dirt. Generally, rubber is not used as a low friction surface since such materials can make it hard to slide the PRDM system 300 against a surface at a constant rate. In some implementations, the back-side 416 also protrudes out (in the +Y) direction along a lip 419, with a uniform distance of protrusion. In some implementations this protrusion of back-side 416 is between about 1 mm and about 5 mm.

The slot 310 includes a front-facing opening 408, which provides access to an operator interface 410, 410' of the PRD 100 (FIG. 4A, 4B). In this embodiment, the operator interface includes a view screen 410 and control buttons 410'. Access to the PRD 100 is also available through a bottom wall 418 of the housing 302, which includes a bottom opening 420, which is shown covered by a door 422. In some implementations, the bottom opening 420 includes a latching mechanism for securing the PRD 100 in the slot 310. In the shown embodiment, the latching mechanism is configured as a latch or a bar 424 that mates with door hooks 426. In some implementations, the front-facing opening 408 includes a transparent cover, such as a flexible transparent cover that allows access to the operator interface 410, 410'.

Figure 4D:
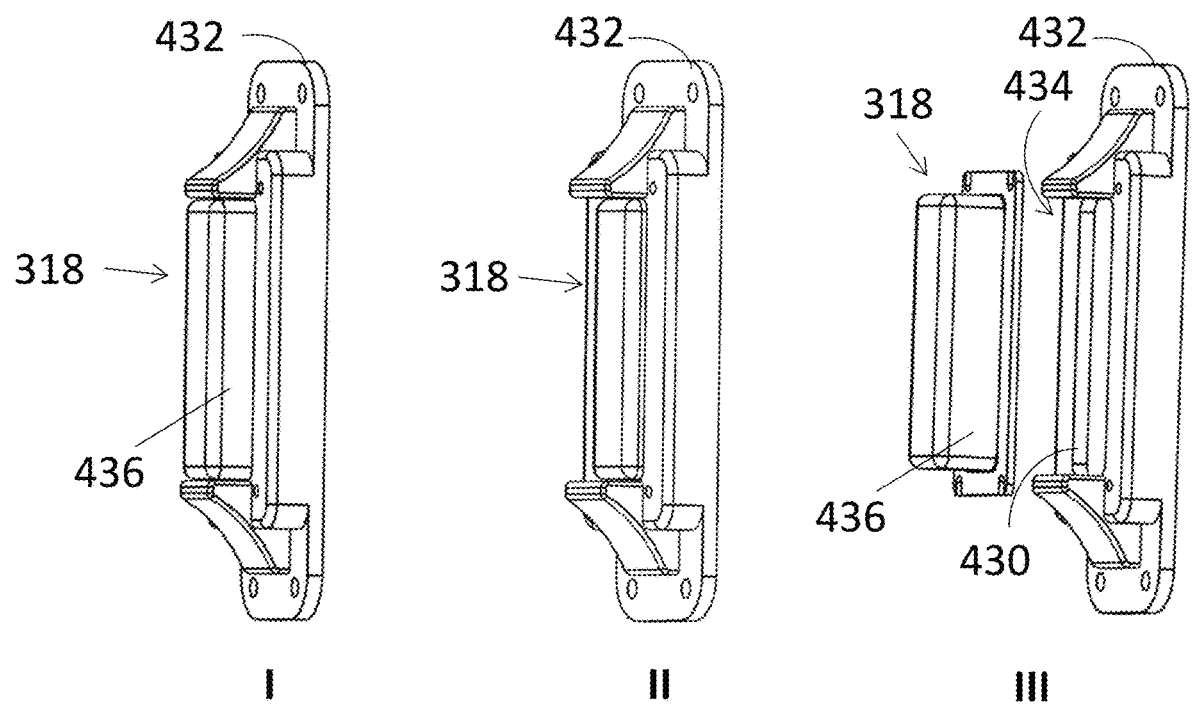

In some implementation, the trigger 318 partially enters the interior portion 312 (FIG. 3) through a trigger opening 430 as illustrated by FIG. 4D. FIG. 4D shows detailed views of the trigger 318: the left panel (I) shows the trigger in a resting position (e.g., not engaged by a user), center panel (II) shows the trigger in an activated position (e.g., engaged by a user), and the right panel (III) shows the trigger in a blown-up configuration. The trigger opening 430 is defined in a trigger mount 432, which is used to couple the trigger 318 to the housing 302 (FIG. 4B). The trigger mount 432 also defines an interior sub-portion 434, which comprises a part of the interior portion 312. The trigger opening 430 can include a flexible interface which contacts sides 436 of the trigger 318. For example, the flexible interface can be a gasket placed at the trigger opening 430. The flexible interface maintains a seal to the interior portion 312 and provides a wiping action against the sides 436 of the trigger 318 when the trigger 318 moves into the interior portion 312 (i.e., the interior sub-portion 434). This helps mitigate against unwanted materials such as water, dust, dirt, and grease entering the interior portion 312.

Figure 5A:
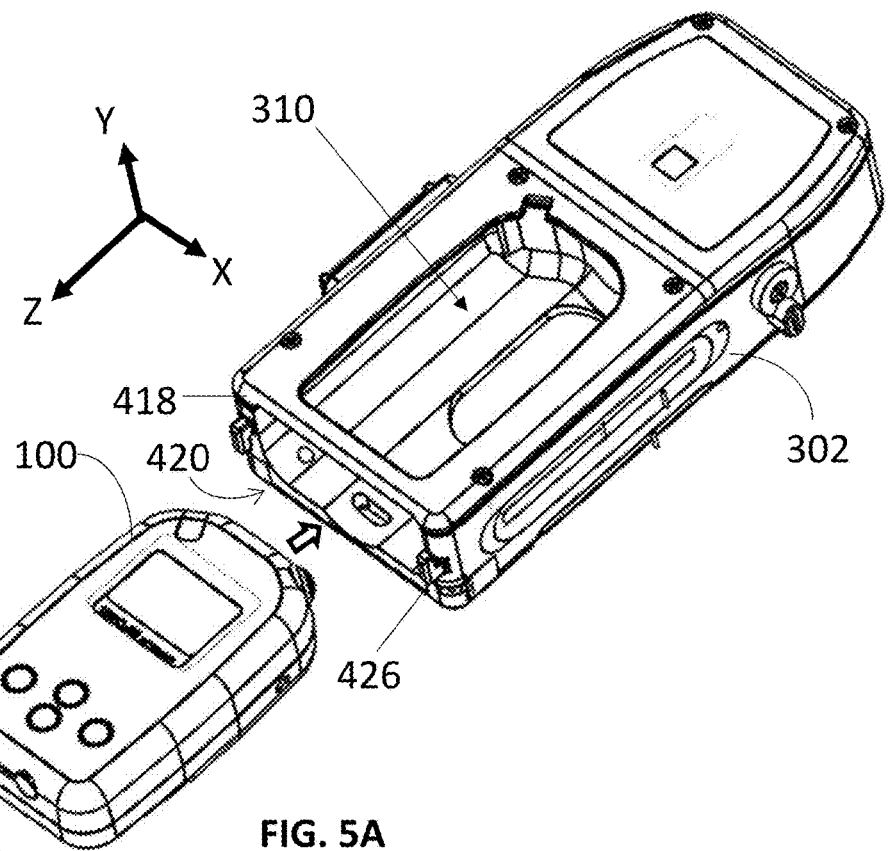
FIG. 5A shows a blown-up 3D view of the PRDM system depicted in FIGS. 4A-4D.

FIG. 5A shows a blown-up 3D view of the embodiments depicted in FIGS. 4A-4C to illustrate the placement of the PRD 100 into the slot 310 of the housing 302 through the bottom opening 420. The latch 424 pivotally couples to the door 422 by female/male features 528/530. The latch 424 rotates into position engaging the door hooks 426 to secure the door 422 to the bottom wall 418, covering the bottom opening 420. This provides a secure coupling of the PRD 100 into the housing 302, which assures the detector 412 (FIG. 4C) of the PRD 100 is always positioned in about the same place relative to the radiation source 322 (FIG. 4C). This also allows easy removal of the PRD 100 from the housing 302 as may be required, for example, for maintenance (e.g., battery replacement, cleaning, charging, shipping, replacement or upgrading to a new or different PRD), or for use as a standalone PRD. Similarly, the housing 302 can be separately isolated this way from the PRD 100 as needed (e.g., as a radiation source).

Figure 5B:
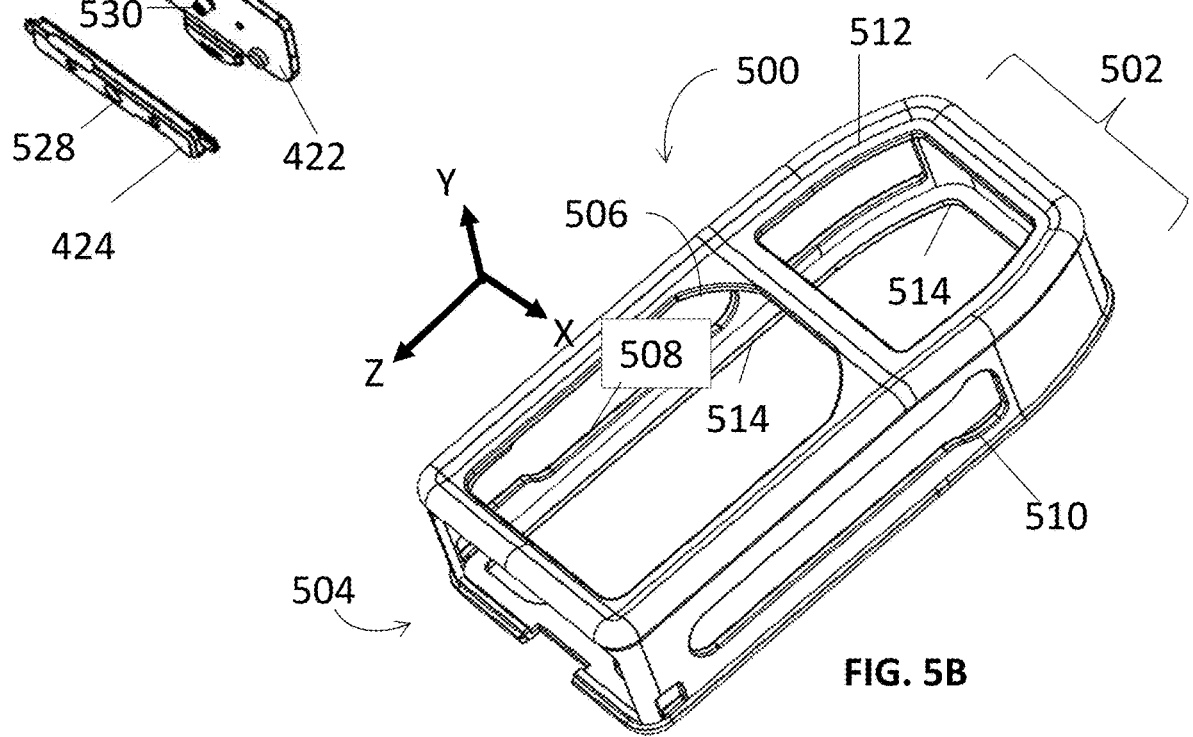
FIG. 5B shows an 3D view of a boot for the PRDM, according to some implementations.

In some implementations, the PRDM system 300 (FIG. 4A) includes a boot 500 as shown in FIG. 5B. The boot 500 can be made using shock absorbing materials. Without limitation, and by way of example, these shock absorbing materials can include silicone, rubber, leather, plastics (e.g., polyurethane, polycarbonate), thin metals (e.g., titanium, aluminum), fabrics, and combinations of these. The construction of the boot 500 is configured to allow stretching and a snug fit against the housing 302 (FIG. 5A). The boot 500 can also include features such as additional material or bumpers at corners, which may be rounded. In some implementations, top portion 502 of the boot 500 incudes additional material since the PRDM system 300 tends to be top heavy and in a fall top portion 502 is most likely to first contact the floor. For example, in some implementations, the top portion 502 has thicker walls than at other positions of the boot 500. In addition to shock, the boot 500 can provide anti-scratch and additional environment protection to the PRDM system.

The boot 500 includes cutouts such as placement cutout 504 for removable placement of the housing 302 (FIG. 5A) into the boot 500. Once the PRD 100 is placed in the boot 500, the cutouts allow access to various components. A PRD cutout 506 is aligned to front-facing opening 408 (FIG. 4A). A trigger cutout 508 provides user access to the trigger 318, and on the opposite side a safety latch cutout 510 provides user access to the safety latch 406 (FIGS. 4A-4C). A front cutout 512 is provided for viewing the front side 414 (FIG. 4A). The back-side of the boot 500 is open, including the back cutout 514, so that the radiation source 322 and the detector 412 (FIG. 4C) do not have additional material to penetrate through. In some implementations, the lip 419 (FIG. 4C) aligns with the back cutout 514, and the back-side protrudes out of the housing 302 so that the back-side 416 of the housing 302 is approximately co-planar with the back surface of the boot. This allows the low friction surface 417 to be contacted with a surface of a volume to be probed and allows the radiation source 322 and the detector 412 to be positioned as close as possible to the surface of the volume to be probed.

Details of externally visible elements of an embodiment of the PRDM system 300 have been described above. The forgoing FIGS. 6A-9H, will described details of the interior portions of the PRDM system 300.

Figure 6A:
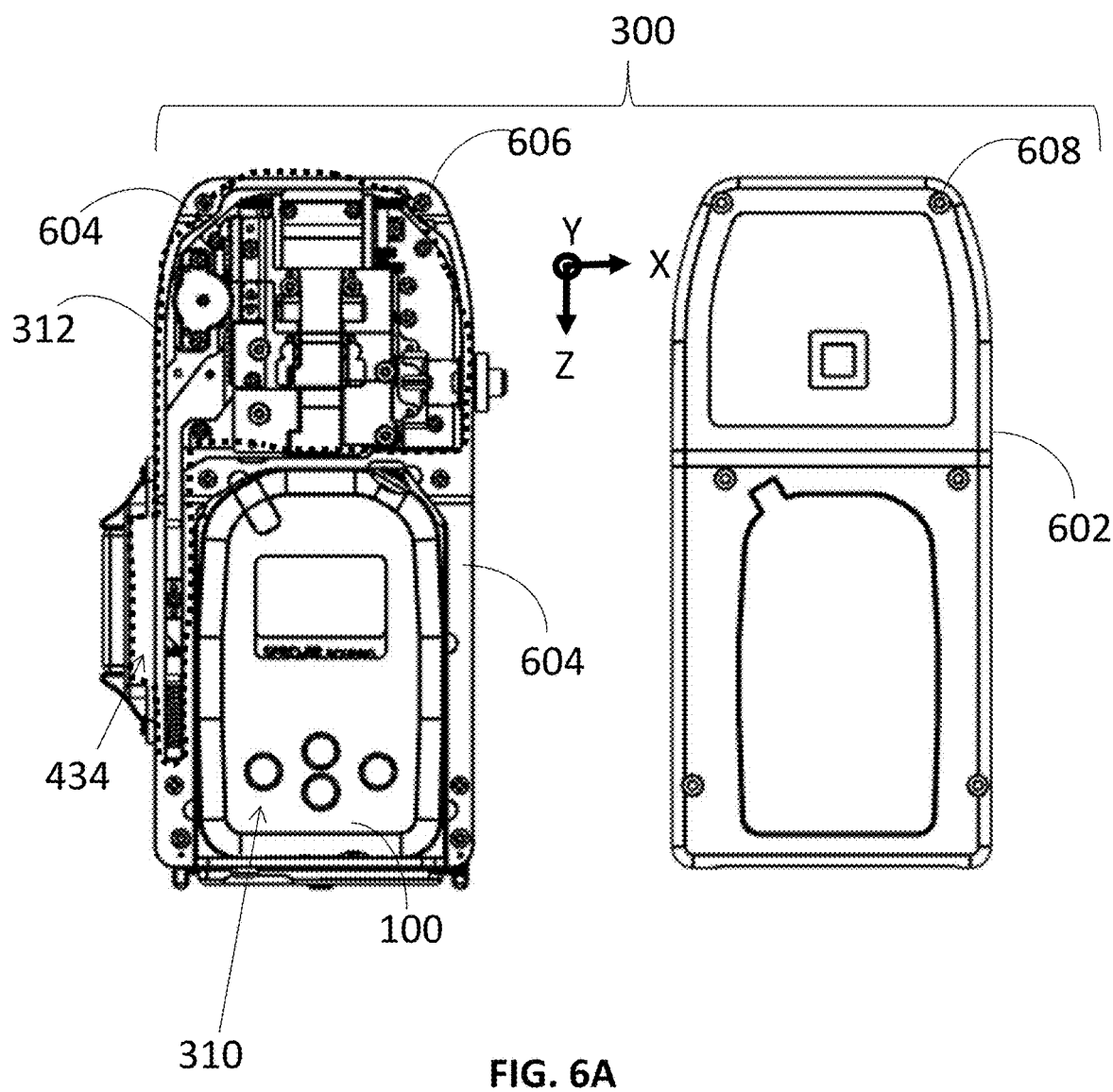
FIGS. 6A-6B, show details of the interior portions of the PRDM system, according to some implementations.

FIG. 6A shows a front view of the PRDM system 300, where a housing cover 602 is shown removed to reveal the interior elements. Placement of the housing cover 602 against the front of walls 604 provides an interior space. The interior portion 312 is highlighted by a dotted line. The position of the interior sub-portion 434 is also indicated, as is the PRD 100 in the slot 310. In some implementations, access to the interior portion is restricted, for example by fasteners placed through holes 606 and 608, which couple the walls 604 to the housing top cover. Other fastening means can be used such as snap fittings, clamps, straps, adhesives and compression fittings. In some implementations, a gasket commensurate with the front of walls 604 is included. The gasket helps seal the interior portion 312 from the outside environment.

Figure 6B:
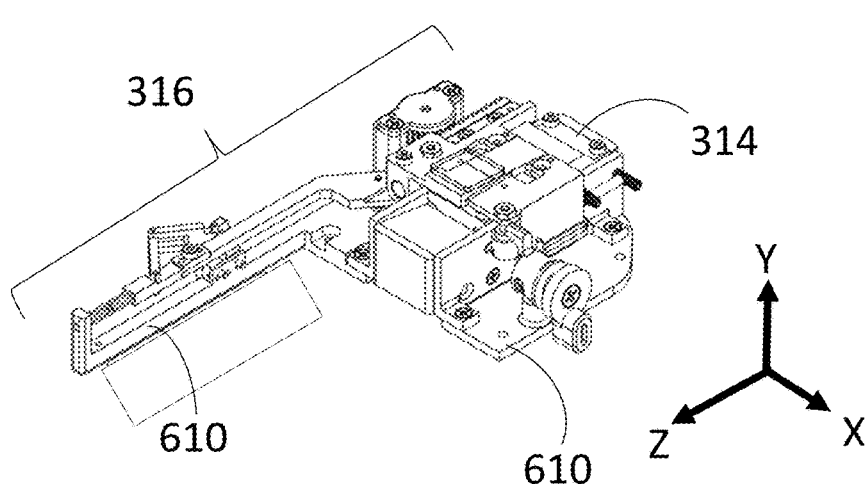

FIG. 6B is an isometric view of components in the interior portion 312. The shield assembly 314 and the actuator 316 are mounted to a base 610. The base can be made using any rigid material. In some implementations, the base includes aluminum, titanium, steel, a thermoset, or a thermoplastic. In some implementations, the base is an aluminum alloy. The base is fastened to the housing by any useful means.

Figure 7A:
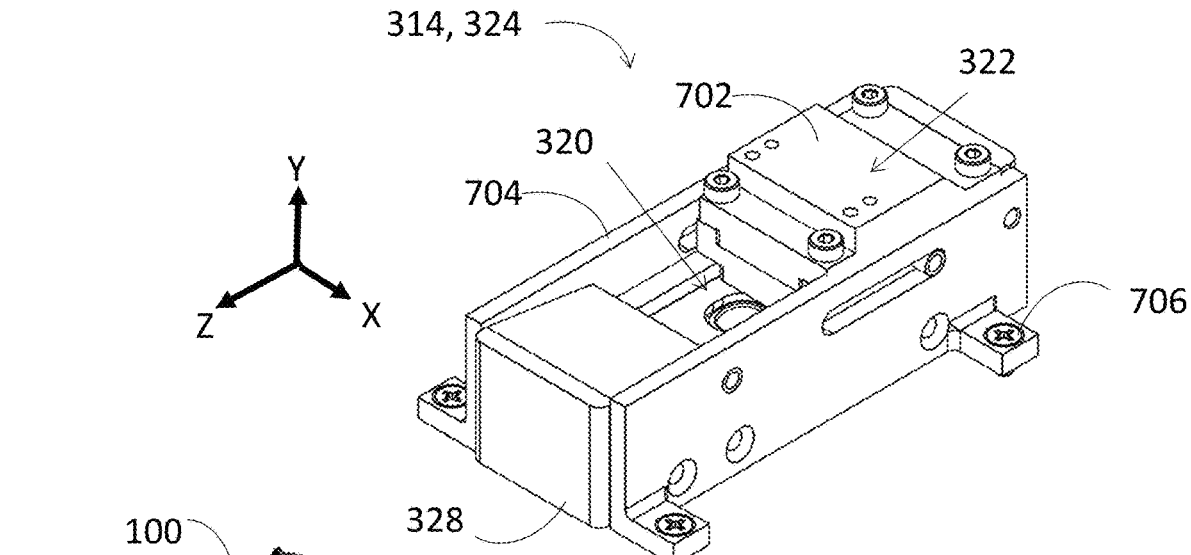
Figure 7B:
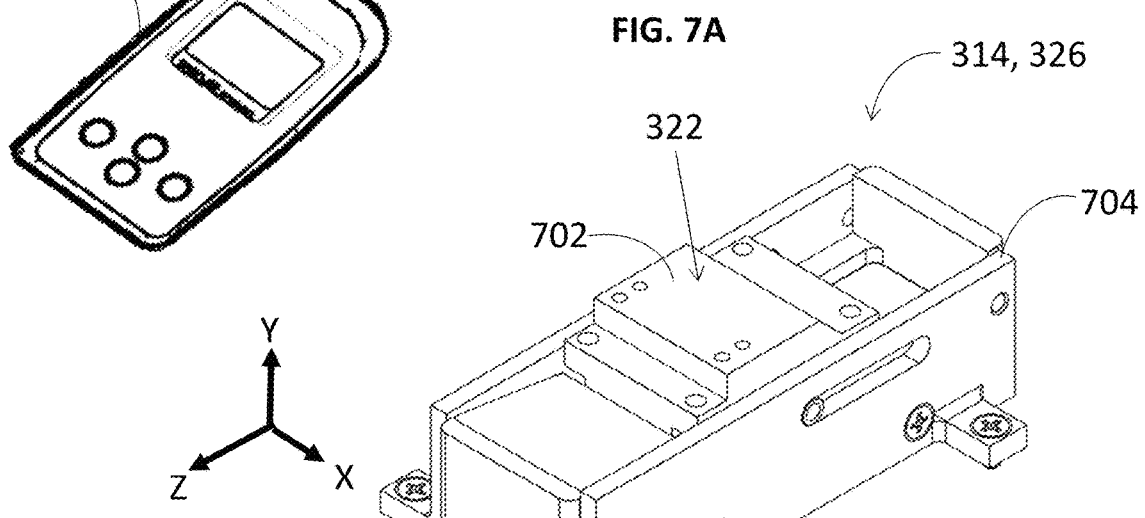

FIGS. 7A and 7B show isometric views of the shield assembly 314. Relative positioning of the PRD 100 in the slot 310 are also shown. The slot 310 and the PRD 100 are not shown to scale relative to the shield assembly 314 in these figures, nor are they rendered in 3D: rather, the slot 310 and the PRD 100 are depicted to show the approximate relative positioning with respect to the shield assembly 314. FIG. 7A shows the shielding configuration 324, and FIG. 7B shows the exposure configuration 326.

The shield assembly 314 includes a container 702 mounted on rail 704. The radiation source 322 (not seen) is positioned in the container 702. The container 702 moves along the rail 704 to toggle between the shielding configuration 324, and the exposure configuration 326. As illustrated by FIGS. 7A and 7B, two rails are used in this embodiment. The aperture 320, included in wall 328, is shown in FIG. 7A. The rail 704 and the wall 328 are fastened to the base 610. For example, using fasteners such as 706.

As illustrated in FIG. 7A, in the shielding configuration 324, the container 702 is distal to the slot 310. Conversely, as illustrated in FIG. 7B, in the exposure configuration 326, the container 702 is proximate to the slot 310. This design helps to minimizes escaping radiation from the source 322 which can raise the background noise created from direct irradiation from the radiation source 322 to the detector 412 in the PRD 100 (i.e., direct irradiation of PRD 100 is less in the shielding configuration as compared to the exposure configuration).

FIG. 7C shows an isometric view of the wall 328 and relative positioning of the PRD 100 in the slot 310. As in FIGS. 7A and 7B, the PRD 100 and the slot 310 are not shown to scale or in 3D and are included to illustrate the general orientation and relative position to the wall 328. The wall 328 includes a large protrusion 710 and a small protrusion 712, both of which provide shielding, in addition to the container 702, for the radiation source 322. The protrusion 710 is larger or thicker than the protrusion 712. This design provides a higher shielding towards the bottom, where the PRD 100 is positioned when it is in the slot 310, and helps to further minimize signal noise created from irradiation from the radiation source 322 to the detector 412 in the PRD 100. The aperture 320 is shown and has a boundary 722 on a front surface 714 of the wall 328.

FIG. 7D shows a 3D view of the wall 328 oriented to view the back of the wall 328. The aperture 320 is cone shaped through the wall 328. That is, a boundary 718, which is on a back surface 720 of the wall 328, is larger than the boundary 722. The aperture 320 is a collimator and serves to collimate radiation emitted from the radiation source 322.

FIG. 7E is a bottom view of the container 702 and rails 704. In some implementations, the container 702 is assembled from at least a front part 703 and a back part 705. These are nested together such that they are join at a stepped interface, shown in the dashed circle 707. This nesting reduces radiation leaking out of the container, as compared to a coupling that is not stepped.

FIGS. 8A-8D show additional views of the shield assembly 314. FIG. 8A shows a top view of the shield assembly 314 in the shielding configuration 324. FIG. 8B shows a back view of the shield assembly 314 in the shielding configuration 324. FIG. 8C shows a top view of the shield assembly 314 in the exposure configuration 326. FIG. 8D shows a back view of the shield assembly 314 in the exposure configuration 326. The radiation source 322 is positioned in the container 702 which moves along the rail 704 to toggle between configurations.

The wall 328 is shown in FIGS. 8B and 8D as transparent with boundaries as dashed lines so that the features of the container 702 can be viewed through wall 328. A solid portion 802 of wall 328 is indicated. The radiation source 322 is shown in the container 702. An opening 804 in the container 702 is positioned above the radiation source 322. In the shielding configuration 324, the solid portion 802 of the wall 328 covers the opening 804. In the exposure configuration 326 the opening 804 is at least partially aligned with the aperture 320. The position of the radiation source 322 and the opening 804 is shown in dashed outline in FIGS. 8A and 8C.

Figure 9A:
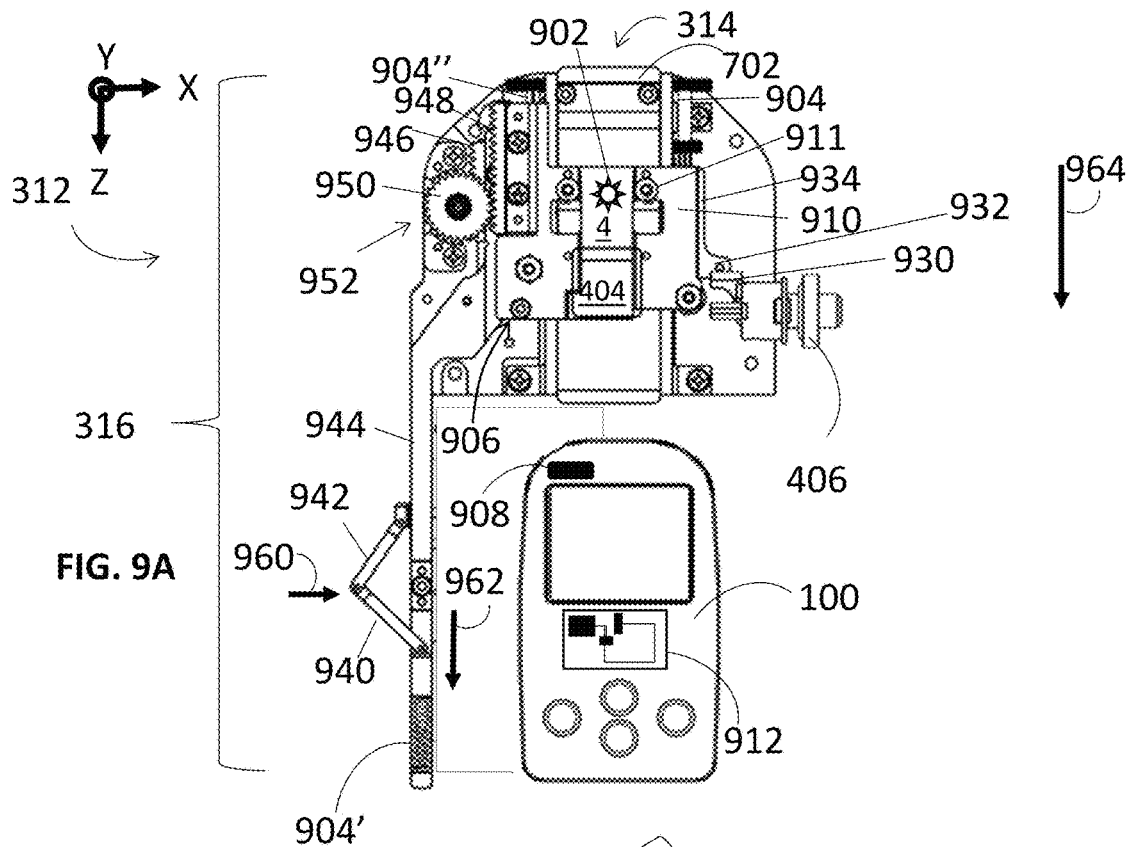
FIG. 9A-9H show additional details of interior components of the PRDM system, according to some implementations.
Figure 9B:
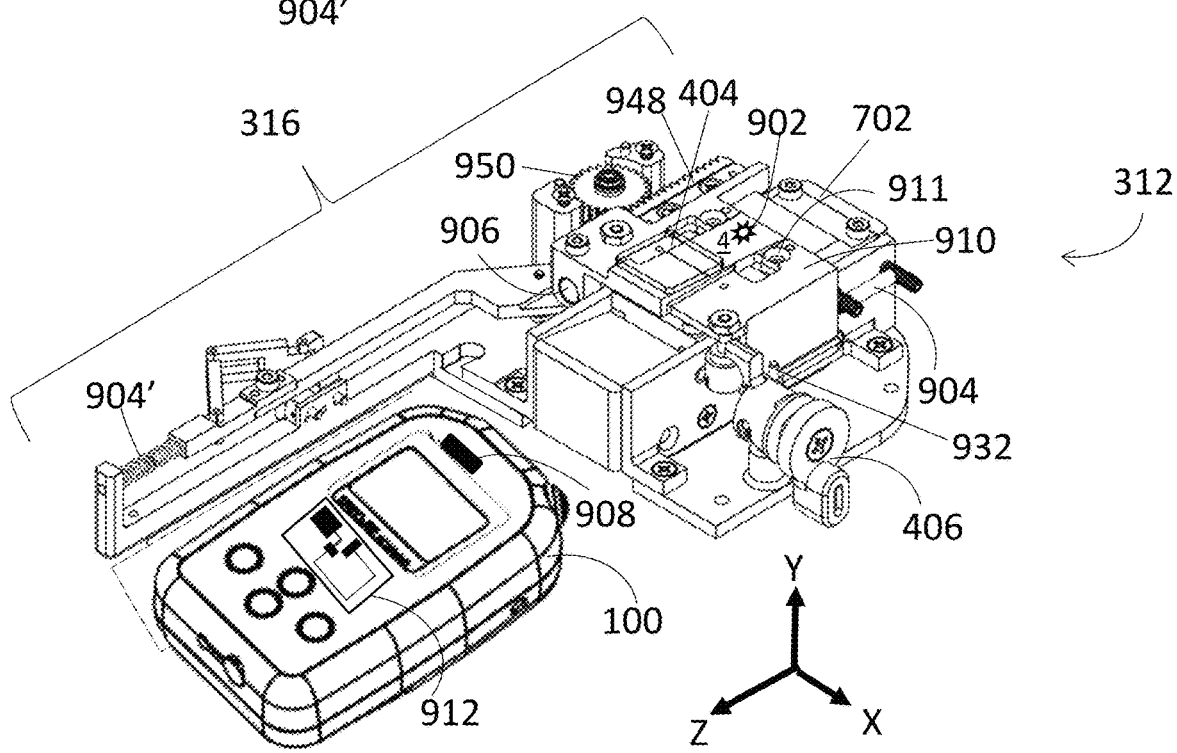

FIGS. 9A and 9B show additional features of the interior portion 312. FIG. 9A is a top view and FIG. 9B is an isometric view in the shielding configuration 324 (FIG. 8A). An indicator 902, a tensioner 904, a tensioner 904', a switch activator 906, the safety latch 406, the shield assembly 314, and components of the actuator 316 are shown. The position of the PRD 100 when it is in slot 310 (FIG. 6A) is also indicated, as well as a switch 908 in the PRD 100.

The shield assembly 314 is coupled to the PRD 100 by the switch 908 which is positioned in the PRD 100. In some implementations, the switch 908 is mounted to an outer surface of the PRD 100. The switch activator 906 is connected to the shield assembly at a shield rack 910. The shield rack is attached to the container 702, for example by fasteners 911. The switch activator 906 is far from the switch 908 when the shield assembly 314 is in the shielding configuration 324, as shown in FIGS. 9A and 9B. When the shielding configuration 314 is in the exposure configuration (FIG. 8B) the switch activator 906 is brought closer to the PRD 100, which activates the switch 908.

In the embodiment shown by FIG. 9A, the switch activator 906 is a magnet mechanically coupled to the container 702 and the switch 908 is a reed switch. The magnet is brought into proximity to the reed switch in the exposure configuration 326, thereby activating the reed switch. Other switches are contemplated requiring some minor modification. For example, a Near Field Communication device can be used where the switch activator 906 is configured as a read only tag and the switch 908 includes reading circuitry to recognize the read only tag. In another embodiment, the switch 906 can be configured as a mechanical switch, for example mounted to the PRD 100. The switch activator 906 can be configured as an arm or the like to physically activate the mechanical switch.

The switch 908 is connected to a computer 912 including at least a CPU, a volatile memory, and a nonvolatile memory for executing algorithms written to the nonvolatile memory. The CPU also includes connections to various components of the PRD 100 such as the operator interfaces 410 and 410' and the detector 412 (FIG. 4A-4C). The computer 912 is also connected to a power source, such as batteries in the PRD 100. Other components, such as transmitters and receivers for wireless communication can be included in the PRD 100 which are connected to the computer 912.

The computer 912, by executing various commands of the algorithms, can collect data from the detector 412 of the PRD 100, display data on the operator interface 410, and can accept inputs from the operator interface 410' (FIGS. 4A-4C). In addition, the computer 912 includes at least a dose monitoring algorithm and a density monitoring algorithm. The switch 908 engages the dose monitoring algorithm of the PRD 100 when the shield assembly 314 is in the shielding configuration 324 and engages the density detection algorithm of the PRD 100 when the shield assembly 314 is in the exposure configuration 326.

The shield assembly 314 is coupled to an alert. The alert is configured to alert the user when the shield assembly 314 is in the exposure configuration 326. In the embodiment shown by FIGS. 9A and 9B, the alert is a visible indicium provided by the indicator 902. The container 702 is coupled to the shield rack 910. The shield rack 910 includes the indicator 902 on an outer surface 4. The outer surface 4 is approximately opposite the opening 804 (FIG. 8B). As previously described, the housing 302 includes the viewing window 404 (FIG. 4A, 4B). The position of the viewing window 404 is shown in FIGS. 9A and 9B, where the housing supporting the window is not shown so that the interior portion 312 can be seen. The viewing window 404 is positioned facing the outer surface 4. The indicator 902 moves to a position framed by the viewing window 404 and provides a view of the indicator 902 to the user when the shield assembly 314 is in the exposure configuration 326. In some implementations, the shield rack 910 includes a second indicator on the outer surface 4, where the second indicator moves to a position framed by the viewing window 404 and provides a view of the second indicator to the user when the shield assembly 314 is in the shielding configuration 324. Thus, the visible indicium comprises the indicator 902 moving into, and out of, a position framed by the viewing window 404.

In some implementations, the alert can be an audible indicator. For example, the alarm can be a speaker of the PRD 100 which is coupled to the computer 912 and is activated by the switch 908. In some other implementations, the alert can be a light indicator, such as an LED light of the PRD 100 coupled to the computer 912 and the switch 908. In yet other implementations, the alert can be a bell which is coupled to the housing 302 or the PRD 100 and is struck by a striker attached to the shield rack 910.

Figures 9C, 9D:
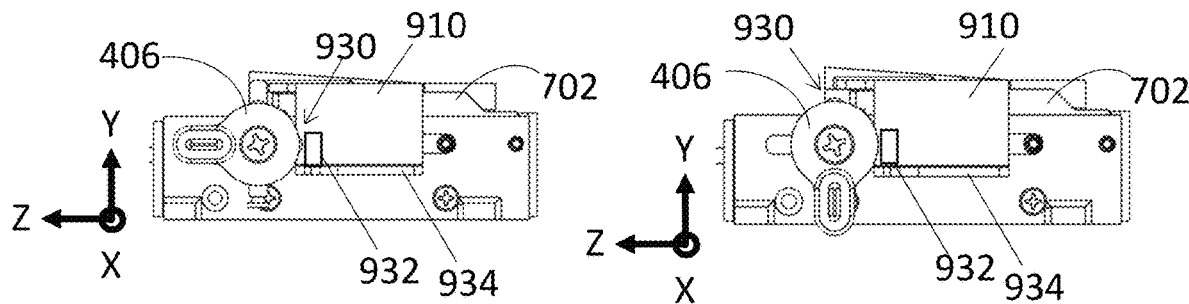
Figure 9E:
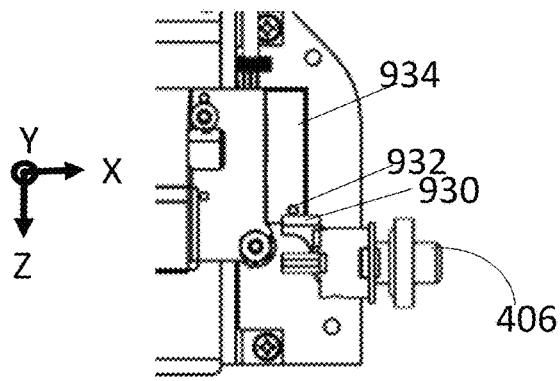
Figure 9F:
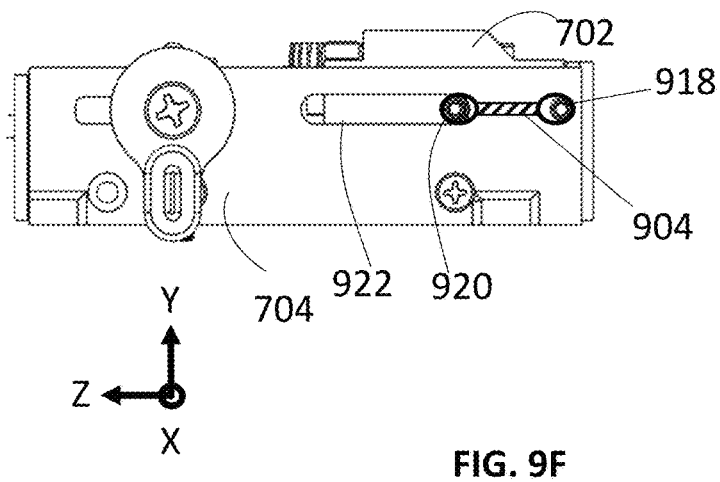

In some implementations, the interior portion 312 is coupled to the safety latch 406. As shown in FIGS. 9A and 9B, in the shielding configuration 324, a stop 930 contacts a pin 932 and does not allow movement of the container 702 from the shielding configuration 324 to the exposure configuration 326. The pin 932 is coupled to the container 702 by a ledge 934 which is part of the shield rack 910. FIG. 9C is a detailed side view of the safety latch 406 in an engaged position, and FIG. 9D is a detailed side view showing the safety latch 406 when it is not engaged. FIG. 9E is a top detailed view showing another embodiment of the ledge 934.

In some implementations, the shield assembly 314 is coupled to the tensioner 904 and the tensioner 904' (FIGS. 9A,9B), which provide tension holding the shield assembly in the shielding configuration. The tensioner 904' is a first spring which keeps the actuator 316 in the shielding configuration 324 and will be described in more detail below. As shown in detailed right view FIG. 9F, the tensioner 904 is a second spring that is attached at a first end to the rail 704 by a pin 918, and the second spring is attached at a second end to the container 702 through a pin 920 which protruded out of the rail 704 through slot 922. The second spring keeps, returns or pulls the container 702 to shielding configuration 324 as shown, when the trigger 318 is not engaged by the user. In some implementations, additional tensioners can be added, for example, to balance the forces acting on container 702. For example, part of the tensioner 904" is seen at the top left of FIG. 9A which provides a balancing force to the tensioner 904. In some implementations, one or more tensioners 904 and 904' can be an elastic material or gas filled piston. In some other implementations, only one tensioner, such as tensioner 904 or 904', is used.

Figure 9G:
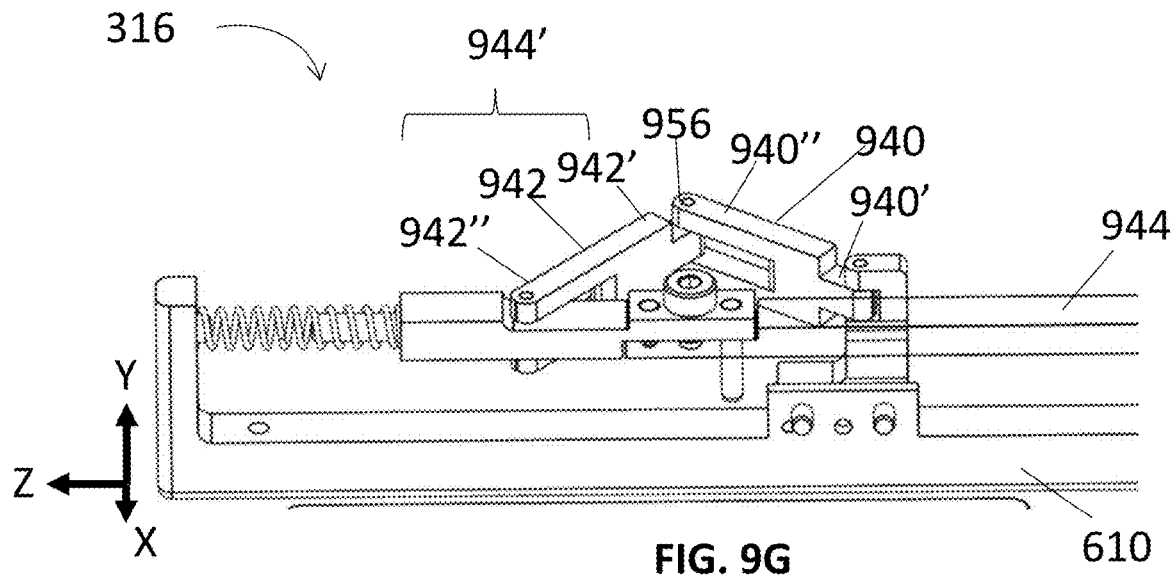
Figure 9H:
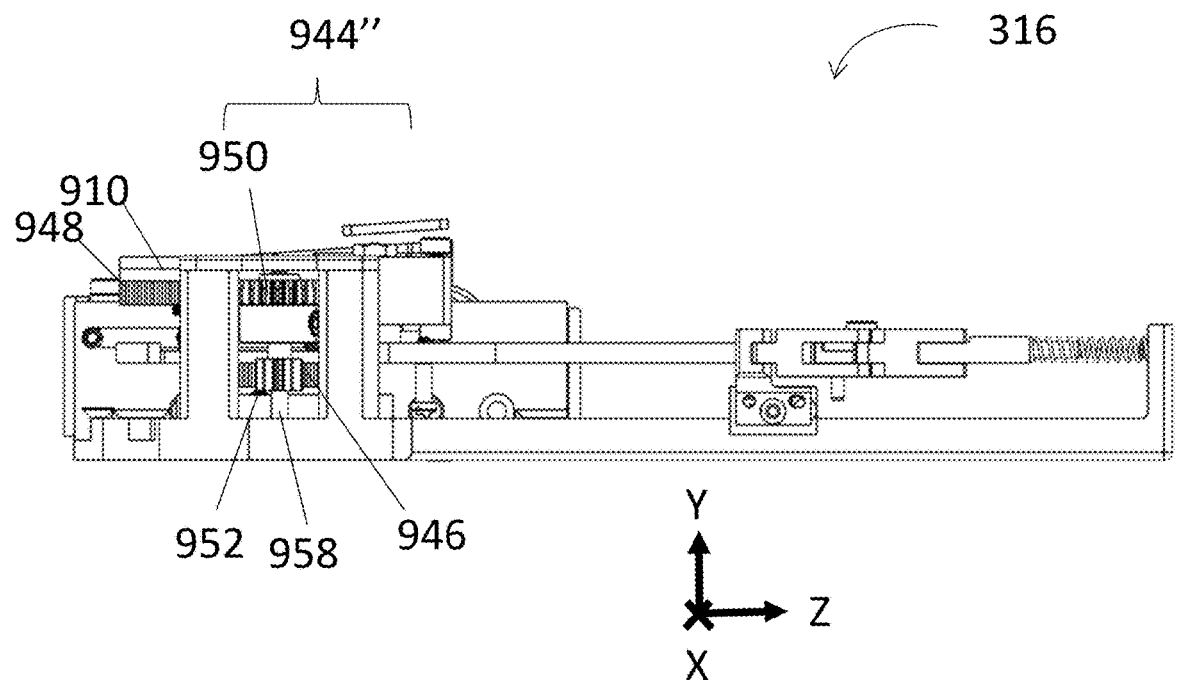

As shown in FIG. 9A, the actuator 316 includes several sub-components: a first lever 940, a second lever 942, an arm 944, a first rack 946, a second rack 948, a large gear 950, and a small gear 952 (under and obscured by the larger gear, shown in FIG. 9H).

FIG. 9G shows a 3D detailed view from the right-side of part of the actuator 316. The first lever 940 is pivotally connected at a first end of the first lever 940' to the base 610, which is connected to the housing 302 (FIG. 5A). A second end of the first lever 940" is pivotally connected to a fulcrum 956. The second lever 942 is pivotally connected at a first end of the second lever 942' to the fulcrum 956. A second end of the second lever 942" is pivotally connected to a first end of the arm 944'.

FIG. 9H shows a left-side detailed view of part of the actuator 316. The first rack 946 is connected to a second end of the arm 944". The small gear 952 is connected to the first rack 946. The small gear 952 is connected to the large gear 950 by an axel 958. The large gear 950 is connected to the second rack 948. The second rack 948 is connected to the shield rack 910, which is connected to the container 702.

The actuator 316 is activated by depressing the fulcrum 956 as shown by trigger vector 960, moving the arm 944 in the direction of an arm vector 962 (FIG. 9A). By virtue of the coupling through the first rack 946, the small gear 952, the axel 958, the large gear 950, and the second rack 948; the shield rack 910 moves in the direction of a container vector 964. Due to the different gear sizes, small gear 952 and the large gear 950, the magnitude of the container vector 964 (a second direction and magnitude) is larger than the magnitude of trigger vector 960 (a first direction and magnitude) and the arm vector 962. The difference in magnitude can be adjusted by changing the gear 952 to the gear 950 size ratio, as well as lengths of the first lever 940 and the second lever 942. The trigger 318 (FIG. 4B) is positioned to provide the trigger vector 960 when depressed by a user.

The tensioner 904' is a spring which is compressed when arm 944 moves in the direction of the arm vector 962. The spring provides a force to counter this movement. Accordingly, the tension 904' keeps or returns the shield assembly 314 to shielding configuration.

Figure 2:
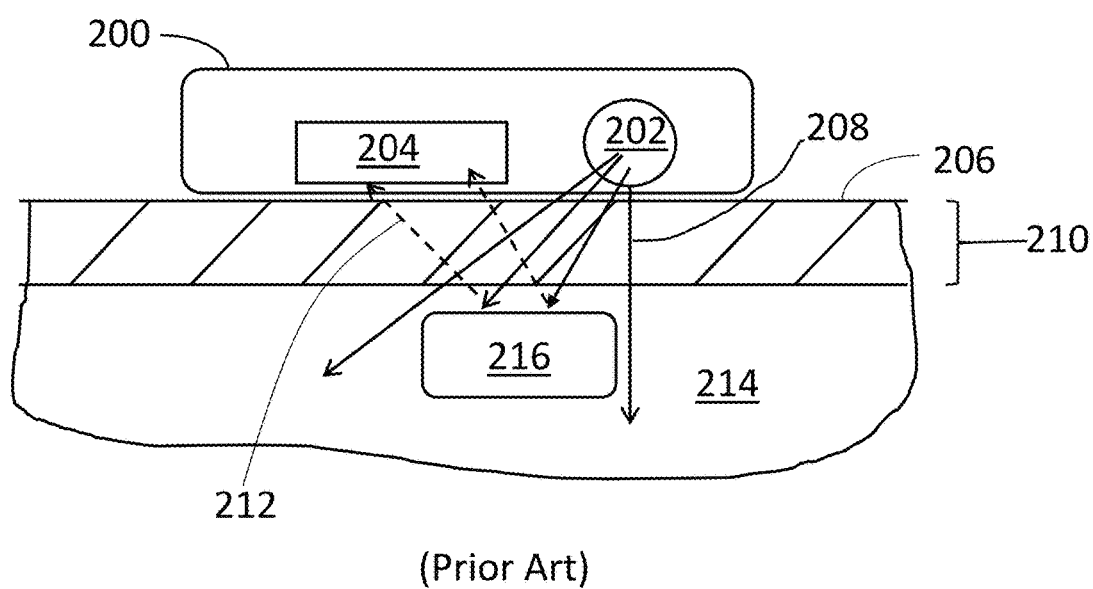
FIG. 2 is a diagrammatic view illustrating a typical usage of a density meter.
Figure 10:
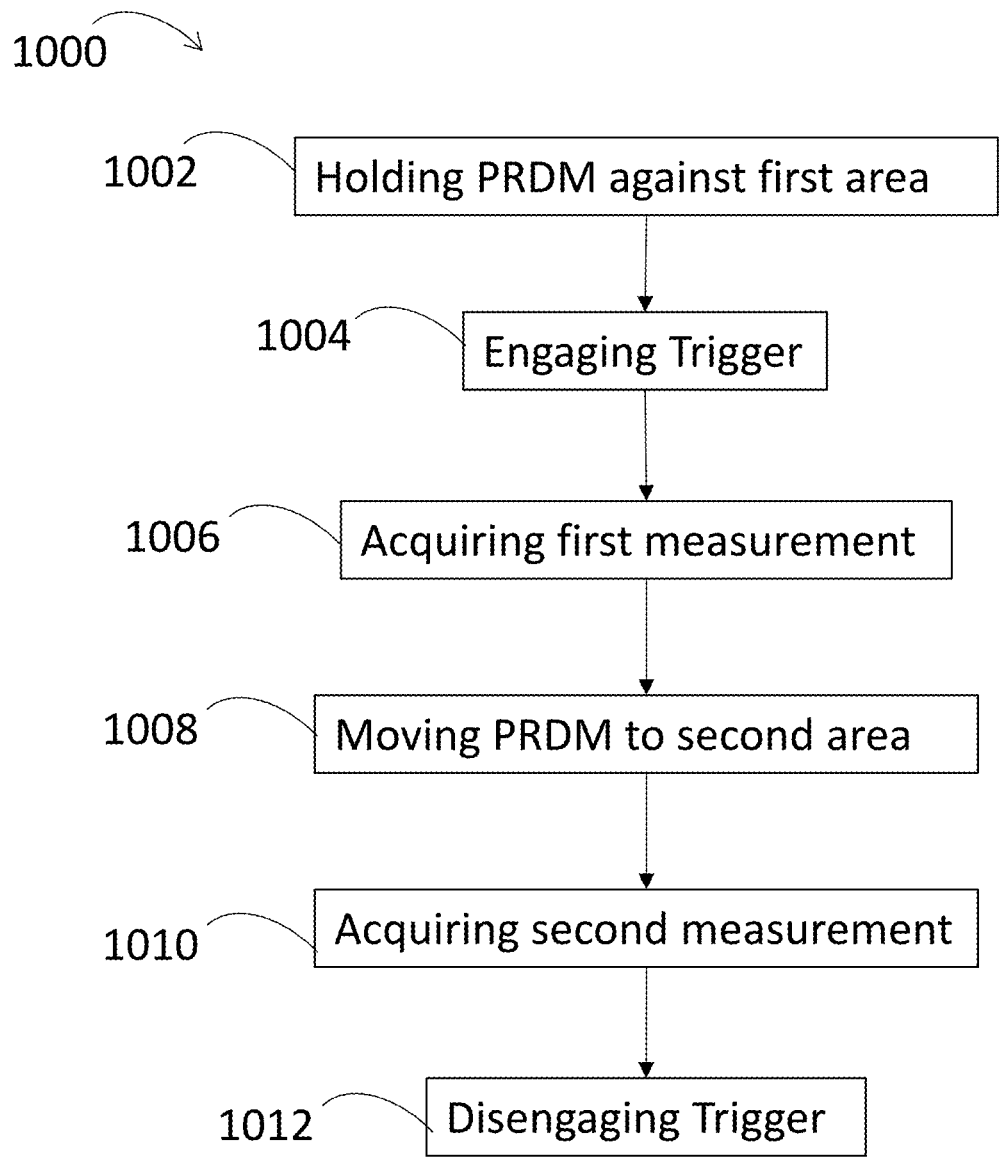
FIG. 10 is a flow diagram showing steps for using a PRDM system, according to some implementations.

The PRDM system 300 described herein can be conveniently used for probing a volume, such as the volume 214 to discover a hidden object, such as object 216 (FIG. 2). FIG. 10 is a flow diagram showing the steps 1000 for using the PRDM system 300. In a first step 1002, the PRDM system 300 is held by a user, optionally with one hand. The user holds the PRDM system so that the aperture 320 is positioned opposite a first area of a volume to be probed. Once the PRDM system 300 is against the first area, the trigger 318 is engaged in a second step 1004. The trigger 318 is engaged by depressing it as previously described. This action moves the shield assembly 314 from the shielding configuration 324, to the exposure configuration 326. As previously described, the trigger 318 activation also activates the density monitoring algorithm of PRD 100. In optional embodiments where the PRDM system 300 does not have the switch 908, the density monitoring algorithm can be activated, such as by the user engaging the operator interface 410, 410'. With the PRDM system 300 in the exposure configuration 326, the radiation source 322 emits radiation through the surface of the volume being inspected, and backscattered radiation provides a first measurement 1006 indicative of a first density in the volume. Once the first measurement data is collected, the user moves the PRDM system 300 to a second area of the surface, in step 1008. A second measurement is collected in step 1010. The procedure is completed by step 1012 which includes disengaging or releasing the trigger 318.

In some implementations, a continuous steady movement is used between the first area and second area where measurements of backscattered radiation are collected between the first and the second area. Generally, this can be done at a speed between about five feet per second to about one inch per second. The user may use a slower speed of movement to probe an area in more detail, such as about 1 foot or less per second, and the user may use a faster speed such as more than 1 foot per second for a more cursory review. An area can be examined multiple times as well.

In implementations of the PRDM system 300 having the safety switch 406, the safety switch 406 is disengaged prior to engaging the trigger (FIG. 9D). The safety switch 406 is then engaged to secure the PRDM system 300 in the shielding configuration 324.

In some implementations, the PRDM system 300 is used as a personal dosimeter. For example, the PRDM system 300, when not in the exposure configuration 326, can monitor radiation. In addition, the PRDM system 300 can include an algorithm to detect radiation that is not due to backscatter from the radiation source 322 and can be configured to provide an alarm if this radiation is above a selected threshold.

In some implementations, the PRDM system 300 can included in a kit. The kit can include material for use of the PRDM system 300. For example, the kit can include a carry case for holding the PRDM system and other items of the kit. The kit can include a strap or lanyard to attach to the PRDM system 300. The kit can include instructions, such as in a booklet or on a wall of the carry case. The kit can also include a holster. In some implementations, the holster includes shielding material (e.g., tungsten or lead). The kit can also include calibration materials.

EXEMPLIFICATIONS

I. A PRDM system was constructed as described herein. Three tests were conducted to detect visually hidden items.

Example 1: Contraband Simulant Behind a Metal Barrier

Two metal barriers were used to "hide" a contraband simulant.

In a first test, a thick (3-4 mm) steel sheet barrier was positioned in front of a 5 lb. bag of flour. The bag of flour was position 1-2 cm from the steel barrier. The PRDM system was then used to scan from the opposite side from the bag of flour. In a second test, the 5 lb. bag of flour was placed in a steel cabinet, about 1-2 cm from the cabinet door. The cabinet door had a thickness of about 1 mm. Table 1 lists the results for both tests. The results are listed in a unitless value which corresponds to the density of low atomic number elements (e.g., C, N, O, H).

TABLE 1

Contraband Simulation Test

| | Test 1: Thick Steel | | Test 2: Thin steel | |
|---|---|---|---|---|
| Repeat # | Area with No material behind | Simulant | Area with No material behind | Simulant |
| 1 | 25-30 | 34-38 | 21-25 | 31-35 |
| 2 | 25-30 | 34-38 | 21-25 | 31-35 |

The PRDM system showed an increase in density when it was positioned in front of where the simulant revealing its presence.

Example 2 Detection of Water Level

A stainless-steel mug (coffee mug) was partially filled with water. The PRDM system was used to scan the upper and lower surface areas of the mug. A difference in relative density was registered as listed in Table 2. The results are in the unitless density values as above.

TABLE 2

Scan over stainless steel mug, partially full of water.

| | Mug | | |
|---|---|---|---|
| Repeat # | Empty top half | Water filled bottom half | Alarm |
| 1 | 25-30 | 45-50 | yes |
| 2 | 25-30 | 45-50 | yes |

The PRDM system easily identified the presence of water. An alarm was also set (>30 relative density). This threshold can be arbitrarily set as an additional way of detecting a density change and alert the user to a hidden item/material.

Example 3: Stud Finder

The PRDM system was used against a drywall supported by wooden studs to detect the location of the studs. The results, as listed in Table 3, show that the studs could be easily identified by the increase in relative density.

TABLE 3

Scanning over drywall to find studs.

| | Wall | |
|---|---|---|
| Repeat # | No stud | Stud |
| 1 | 21-25 | 30-32 |
| 2 | 21-25 | 30-32 |

II. Effect of Shielding.

Figure 11A:
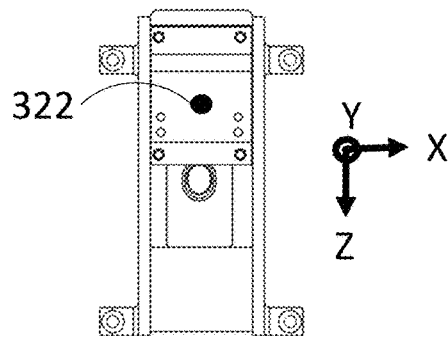
FIGS. 11A and 11B show cartesian coordinates for a PRDM system shielding, according to some implementations.
Figure 11B:
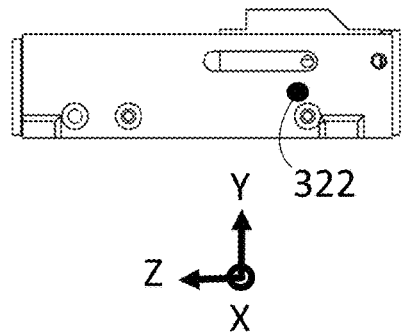

A PRDM system as described herein was constructed. FIGS. 11A and 11B show the relative position of a Ba-133 source 322 where the shutter is closed (the shielding assembly is in the shielding configuration). The source is inside 80% tungsten shielding material. Orientation in the figures is indicated by the labeled cartesian directions (X, Y, Z) where in FIG. 11A +Y is out of the page and in FIG. 11B +X is out of the page. The thickness of shielding from the source to the outer surface of the tungsten is listed in Table 4.

TABLE 4

| Tungsten Thickness | |
|---|---|
| Direction | Thickness (mm) |
| +Z | 48.4 |
| −Z | 16.8 |
| +X | 12.7 |
| −X | 12.3 |
| +Y | 9.5 |
| −Y | 9.7 |

Figure 12A:
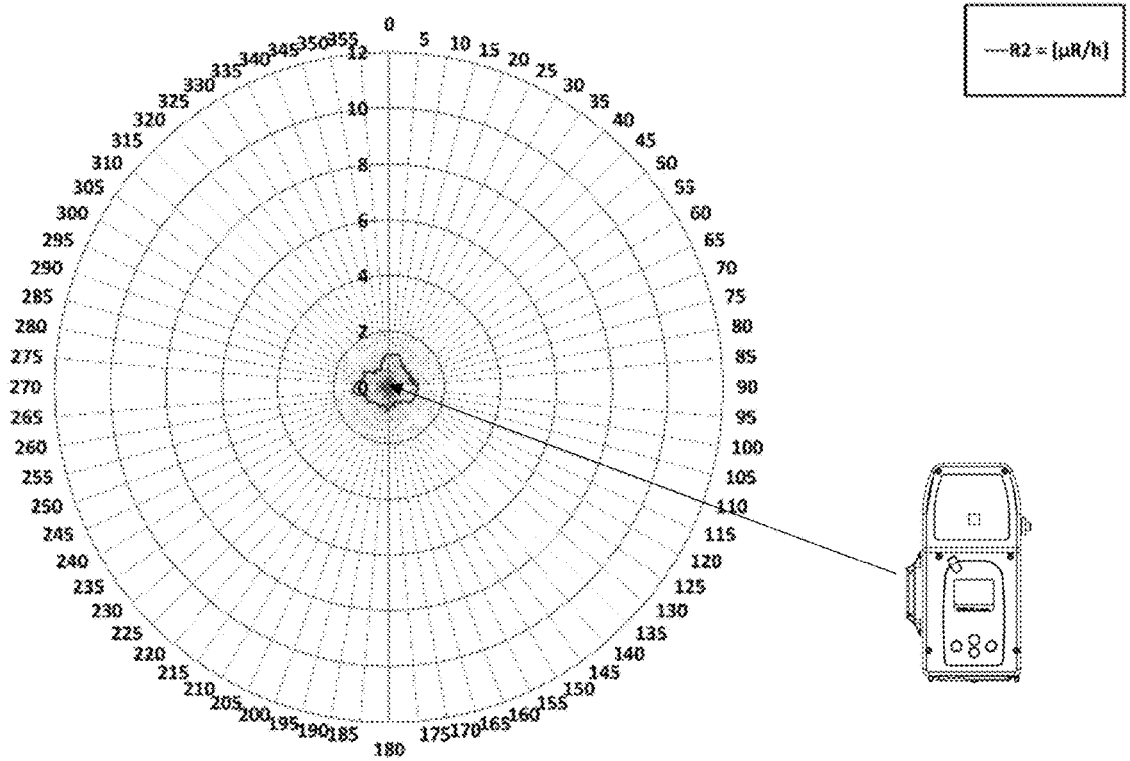
FIGS. 12A-12E are radial plots showing dose rates from a PRDM system, according to some implementations.
Figure 12B:
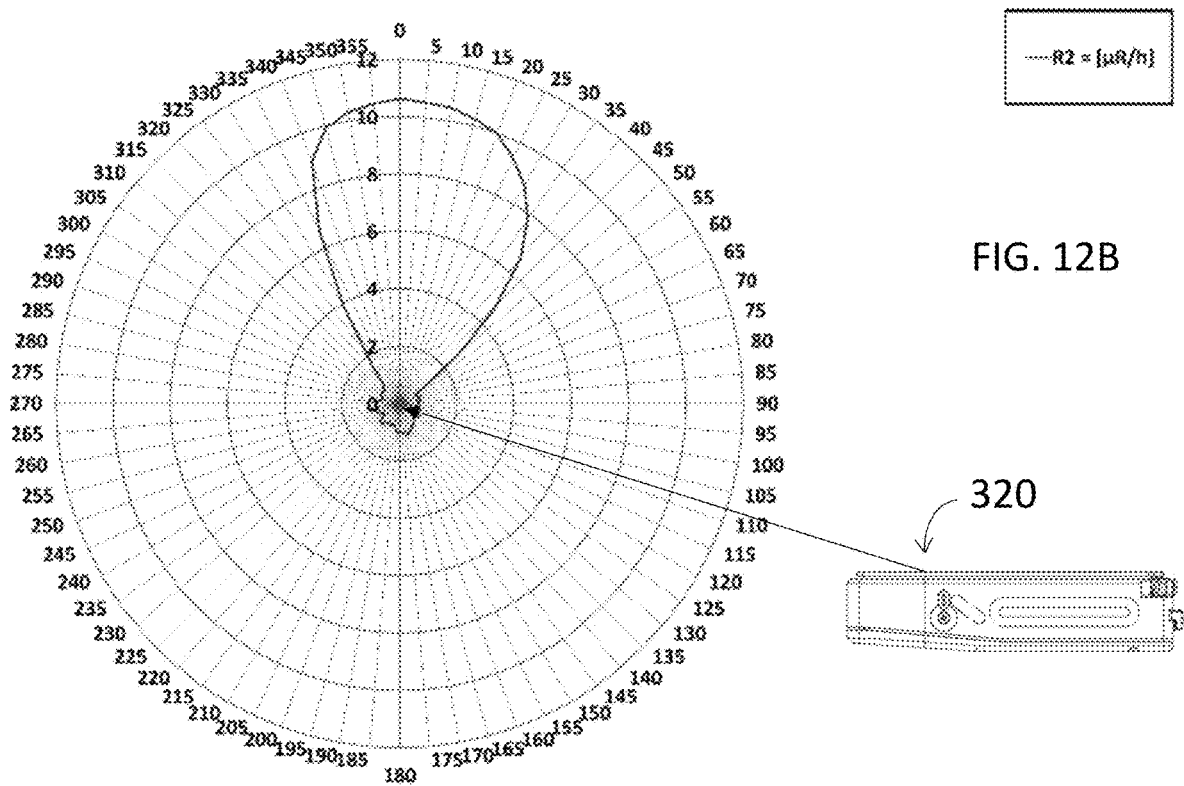
Figure 12C:
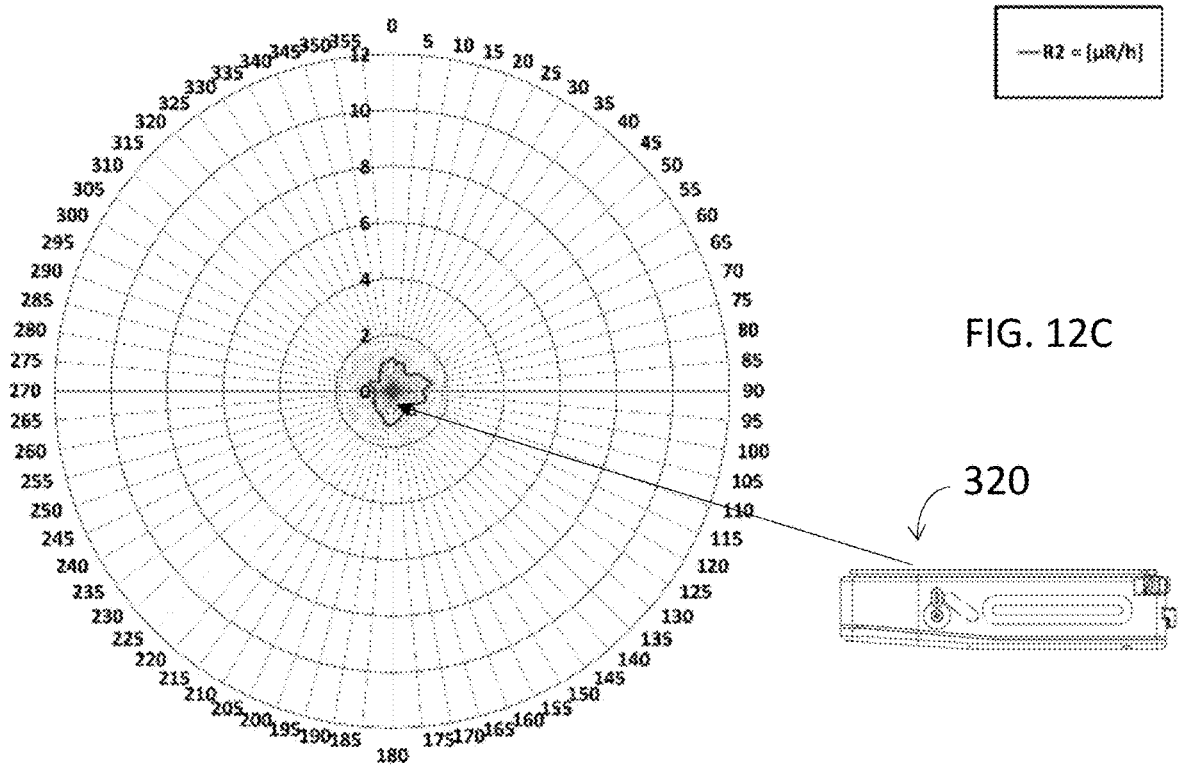
Figure 12D:
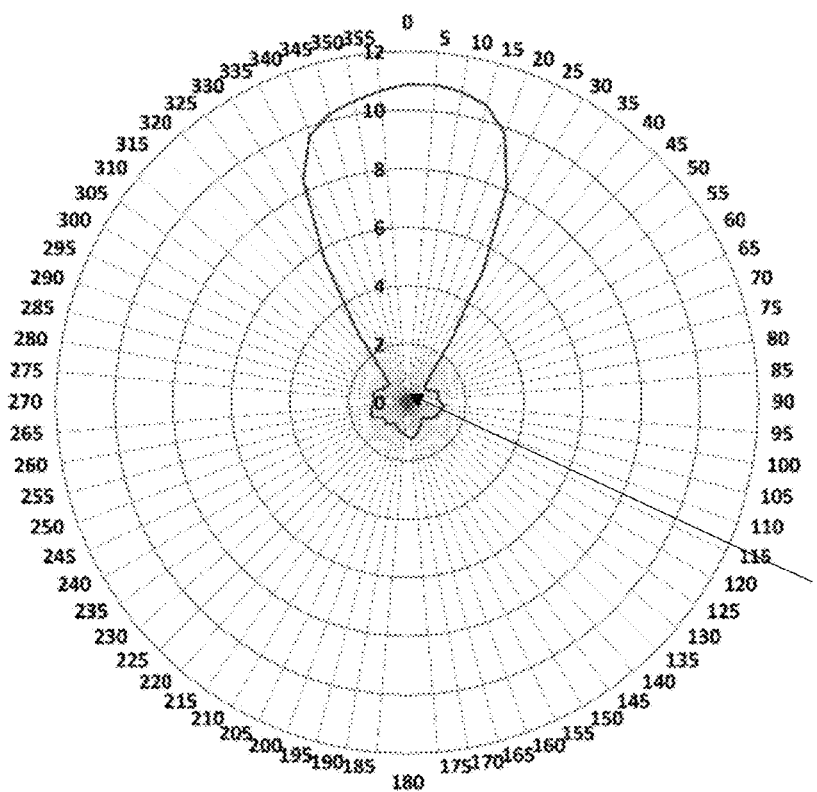
Figure 12D:
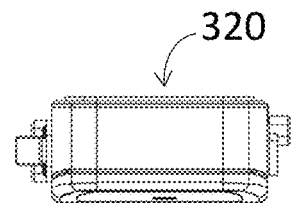
Figure 12E:
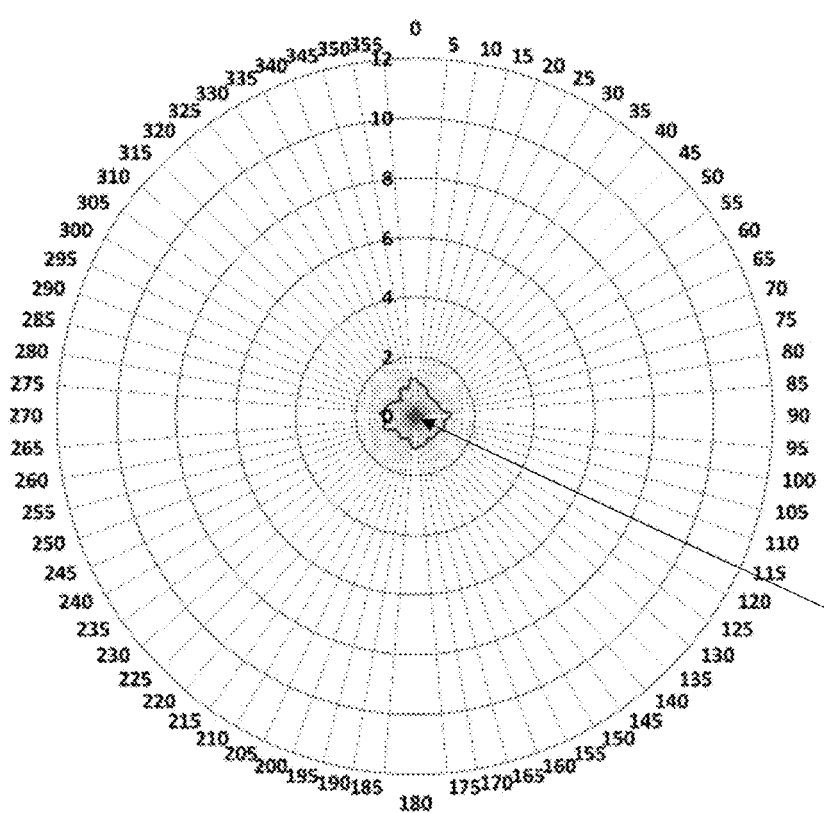
Figure 12E:
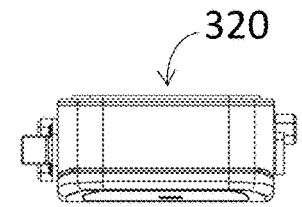

FIGS. 12A-12E are radial plots showing dose rates, measure at the indicated angle. The axis of rotation perpendicular to the page and the origin is approximately at the center of the source. The orientation of the PRDM system 300 is shown, where the position of the aperture 320 is indicated. The arrow indicates that the PRDM system 300 is positioned at the origin, and a detector, recording the radiation, rotates around the PRDM system 300. The radial distances indicate dose rates in R2 (μR/h), and the angle of detection is indicated in degrees (0-360°). FIG. 12A shows rotation around the y-axis with the emission dose rate at 45 cm distance to PRDM system 300 with the shutter closed. FIG. 12B shows rotation around the x-axis with the emission dose rate at 45 cm distance to the PRDM system 300 with shutter open. FIG. 12C shows rotation around the x-axis with the emission dose rate at 45 cm distance to the PRDM system 300 with shutter closed. FIG. 12D shows rotation around the z-axis with the emission dose rate at 45 cm distance to the PRDM system 300 with shutter open. FIG. 12E shows rotation around the z-axis with the emission dose rate at 45 cm distance to the PRDM system 300 with shutter closed. Inter alia, these figures show that even with the shutter open, the dose rate is low, about 10 μR/h.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A personal radiation and density meter system, comprising:
a housing including;
an interior portion configured as an interior space; and a slot;
a radiation detection sub-system including;
a personal radiation dosimeter (PRD) positioned in the slot; and
a radiation emitting sub-system including;
a shield assembly in the interior portion and surrounding a gamma emitting element;
an actuator in the interior portion and coupled to the shield assembly, the actuator configured under user-initiated control to move the shield assembly from a shielding configuration to an exposure configuration;
a trigger mounted to the housing and coupled to the actuator) for one-hand control of the actuator; and
an aperture defined through a wall of the shield assembly and configured to direct radiation out of the shield assembly when the shield assembly is in the exposure configuration.

2. The personal radiation and density meter system according to claim 1, wherein the shield assembly includes a container comprising an opening, and the gamma emitting element is positioned in the container, wherein in the shielding configuration the opening is covered by a solid portion of the wall, and in the exposure configuration the opening is at least partially aligned with the aperture.

3. The personal radiation and density meter system according to claim 2, wherein the container is mounted to a rail and moves along the rail from the shielding configuration to the exposure configuration.

4. The personal radiation and density meter system according to claim 2, wherein in the shielding configuration the container is distal to the slot, and in the exposure configuration the container is proximate to the slot.

5. The personal radiation and density meter system according to claim 2, wherein the shield assembly is coupled to an alert configured to alert the user when the shield assembly is in the exposure configuration.

6. The personal radiation and density meter system according to claim 2, further comprising a switch and a switch activator coupling the shield assembly to the PRD and configured to engage a dose monitoring algorithm of the PRD when the shield assembly is in the shielding configuration, and to engage a density detection algorithm of the PRD when the shield assembly is in the exposure configuration.

7. The personal radiation and density meter system according to claim 1, wherein the shield assembly is coupled to a safety latch mounted to the housing for blocking movement of the shield assembly from the shielding configuration to the exposure configuration when the safety latch is in an engaged position.

8. The personal radiation and density meter system according to claim 1, wherein the slot includes a front-facing opening, wherein the front-facing opening provides access to an operator interface of the PRD in the slot.

9. The personal radiation and density meter system according to claim 1, wherein the housing includes a bottom wall, and the bottom wall includes a bottom opening for removable placement of the PRD into the slot.

10. The personal radiation and density meter system according to claim 1, wherein the trigger partially enters the interior portion through a trigger opening in a trigger mount mounted to the housing when the trigger is engaged by the user, wherein the trigger opening includes a flexible interface contacting the trigger and maintaining a seal to the interior portion.

11. The personal radiation and density meter system according to claim 1, wherein the housing comprises a rigid material.

12. The personal radiation and density meter system according to claim 1, wherein the aperture includes a radiation transparent window.

13. The personal radiation and density meter system according to claim 1, wherein the shield assembly include gamma radiation opaque materials.

14. The personal radiation and density meter system according to claim 1, wherein when the shield assembly is in the exposure configuration, the aperture allows radiation from the gamma emitting element to emit in a general direction away from a back-side of the housing, and a detector of the PRD is positioned to detect backscattered radiation traveling in a general direction towards the back-side of the housing and the detector.

15. The personal radiation and density meter system according to claim 1, wherein the PRD is a spectroscopic personal radiation dosimeter (SPRD).

16. The personal radiation and density meter system according to claim 1, wherein the housing includes a low friction back surface.

17. A method for probing density comprising:
holding the personal radiation and density meter system of claim 1 and positioning the aperture opposite to a first area of a surface bounding a volume to be probed;
engaging the trigger to move the shield assembly from the shielding configuration to the exposure configuration;
acquiring first measurements with the PRD from backscattered radiation from the gamma emitting element, said first measurements indicative of a first density in the volume;
moving the system to a second area of the surface and acquiring second measurements with the PRD from backscattered radiation from the gamma emitting element, said second measurements indicative of a second density in the volume,
disengaging the trigger and allowing the shield assembly to return to the shielding configuration.

18. The method according to claim 17, wherein, the system is used single handedly by the user while acquiring the first measurements and the second measurements.

19. A personal emission device for converting a dosimeter to a density meter, comprising:
a housing including an interior portion defining an interior space;
a gamma emitting element in the interior portion;
a shield assembly in the interior portion and surrounding the gamma emitting element;

an actuator in the interior portion and coupled to the shield assembly, the actuator configured under user control to move the shield assembly from a shielding configuration to an exposure configuration;
a trigger mounted to the housing and coupled to the actuator for one-hand control of the actuator;
an aperture defined through a wall of the shield assembly and configured to direct radiation out of the shield assembly when the shield assembly is in the exposure configuration; and
a slot for removable placement of a PRD.

\* \* \* \* \*